US012217641B2

(12) United States Patent
Sheng et al.

(10) Patent No.: US 12,217,641 B2
(45) Date of Patent: Feb. 4, 2025

(54) DISPLAY PANEL AND DISPLAY DEVICE

(71) Applicant: Shanghai Tianma Microelectronics Co., Ltd., Shanghai (CN)

(72) Inventors: Chenhang Sheng, Shanghai (CN); Juijan Fu, Shanghai (CN); Xiao Li, Shanghai (CN)

(73) Assignee: Shanghai Tianma Microelectronics Co., Ltd., Shanghai (CN)

( * ) Notice: Subject to any disclaimer, the term of this patent is extended or adjusted under 35 U.S.C. 154(b) by 0 days.

(21) Appl. No.: 18/243,696

(22) Filed: Sep. 8, 2023

(65) Prior Publication Data

US 2024/0274045 A1 Aug. 15, 2024

(30) Foreign Application Priority Data

Feb. 10, 2023 (CN) ......................... 202310108826.9

(51) Int. Cl.
*G09G 3/00* (2006.01)

(52) U.S. Cl.
CPC ..... *G09G 3/006* (2013.01); *G09G 2300/0819* (2013.01); *G09G 2310/0278* (2013.01); *G09G 2310/08* (2013.01); *G09G 2330/021* (2013.01)

(58) Field of Classification Search
None
See application file for complete search history.

(56) References Cited

U.S. PATENT DOCUMENTS

2008/0180422 A1* 7/2008 Kusafuka ............. G09G 3/3283 345/204
2021/0097910 A1* 4/2021 Wang ..................... H10K 71/00
2021/0225264 A1* 7/2021 Xuan ....................... G09G 3/32

* cited by examiner

*Primary Examiner* — Nicholas J Lee
(74) *Attorney, Agent, or Firm* — KDW Firm PLLC

(57) ABSTRACT

Provided are a display panel and a display device. The display panel includes a plurality of scan lines and a plurality of data lines, where a scan line of the plurality of scan lines is configured to transmit a scan signal, the scan signal includes a scan enable level and a scan non-enable level, and a data line of the plurality of data lines is configured to transmit a data signal; the display panel includes a display cycle, where the display cycle includes a display preparation stage and a display stage, and the display preparation stage is located before the display stage; the scan line extends in a first direction, the scan line includes a first scan line electrically connected to a first pixel group and a second scan line electrically connected to a second pixel group.

20 Claims, 18 Drawing Sheets

DISPLAY PANEL AND DISPLAY DEVICE

CROSS-REFERENCE TO RELATED APPLICATION(S)

This application claims priority to Chinese Patent Application No. 202310108826.9 filed Feb. 10, 2023, the disclosure of which is incorporated herein by reference in its entirety.

TECHNICAL FIELD

The present disclosure relates to the field of display technologies and, in particular, to a display panel and a display device.

BACKGROUND

Display panels have been widely used in life. At present, display panels of electronic paper have been widely used because of the advantages of low power consumption and eye protection. Currently, display panels of electronic paper are mostly driven by the active matrix drive mode.

In the display process, the display panel needs to constantly refresh the display screen. In the display process, the display panel performs progressive refresh, that is, the scan is performed from the first line to the last line to complete refresh, and the completion of refresh and display from one screen to another screen costs a long time.

SUMMARY

The present disclosure provides a display panel and a display device.

In a first aspect, an embodiment of the present disclosure provides a display panel. The display panel includes a plurality of scan lines and a plurality of data lines. The scan line is configured to transmit a scan signal, and the scan signal includes a scan enable level and a scan non-enable level. The data line is configured to transmit a data signal, and the data signal includes a data enable level and a data non-enable level.

The display panel includes a display cycle. The display cycle includes a display preparation stage and a display stage, and the display preparation stage is before the display stage. The scan line extends in a first direction, the scan line includes a first scan line electrically connected to a first pixel group and a second scan line electrically connected to a second pixel group, the first scan line and the second scan line are arranged in a second direction, and the second direction intersects the first direction.

In the display preparation stage, the time period where a scan enable level transmitted on the first scan line is located is at least partially overlapped with the time period where a scan enable level transmitted on the second scan line is located.

In a second aspect, an embodiment of the present disclosure provides a display device. The display device includes the display panel and a driver chip, where the driver chip is electrically connected to the plurality of data lines and the plurality of scan lines. The display panel includes a plurality of scan lines and a plurality of data lines. The scan line is configured to transmit a scan signal, and the scan signal includes a scan enable level and a scan non-enable level. The data line is configured to transmit a data signal, and the data signal includes a data enable level and a data non-enable level.

DETAILED DESCRIPTION

Figure 1:
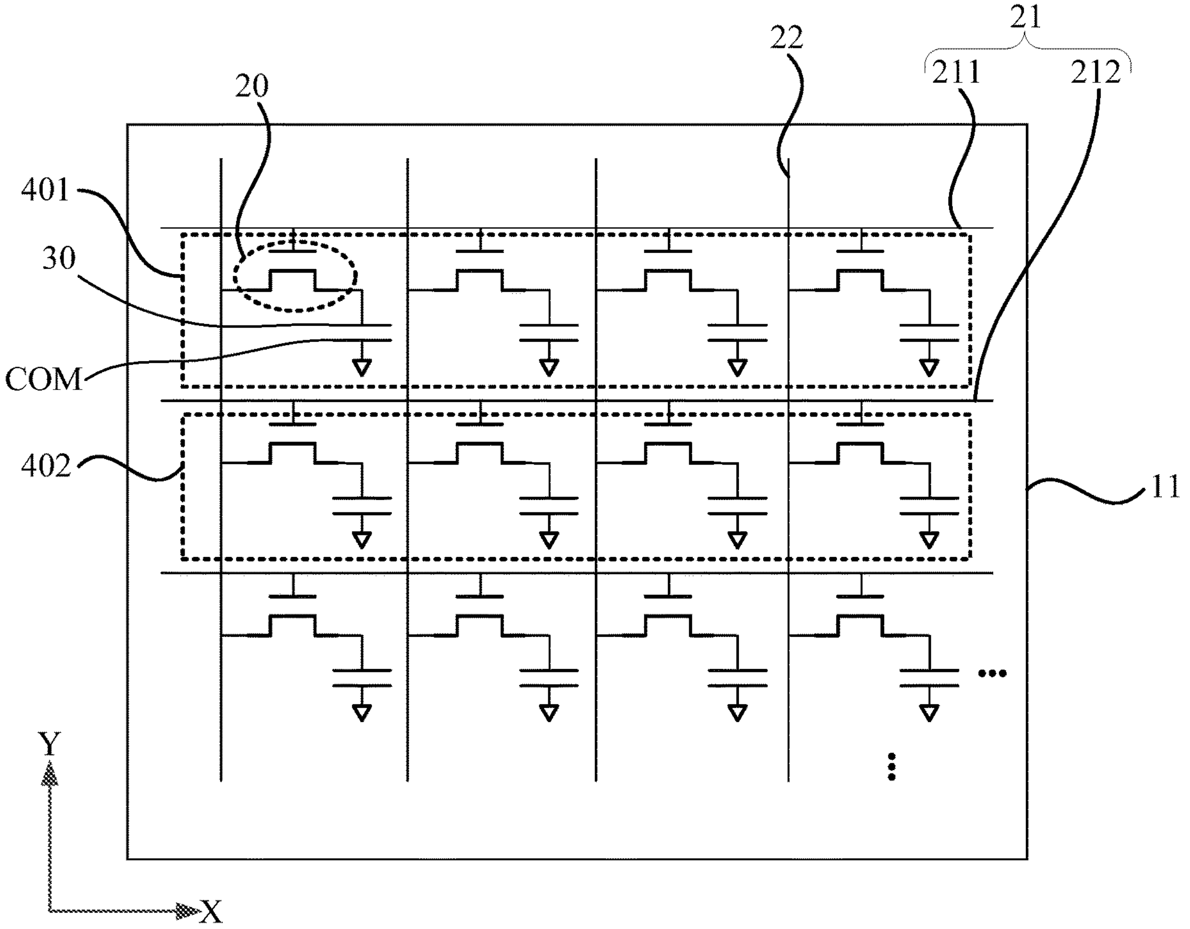
FIG. 1 is a top view of a display panel according to an embodiment of the present disclosure.

Hereinafter the present disclosure is further described in detail in conjunction with the drawings and embodiments. It is to be understood that the embodiments described herein are only intended to illustrate but not to limit the present disclosure. Additionally, it is to be noted that to facilitate description, only part, not all, of structures related to the present disclosure are illustrated in the drawings.

Figure 2:
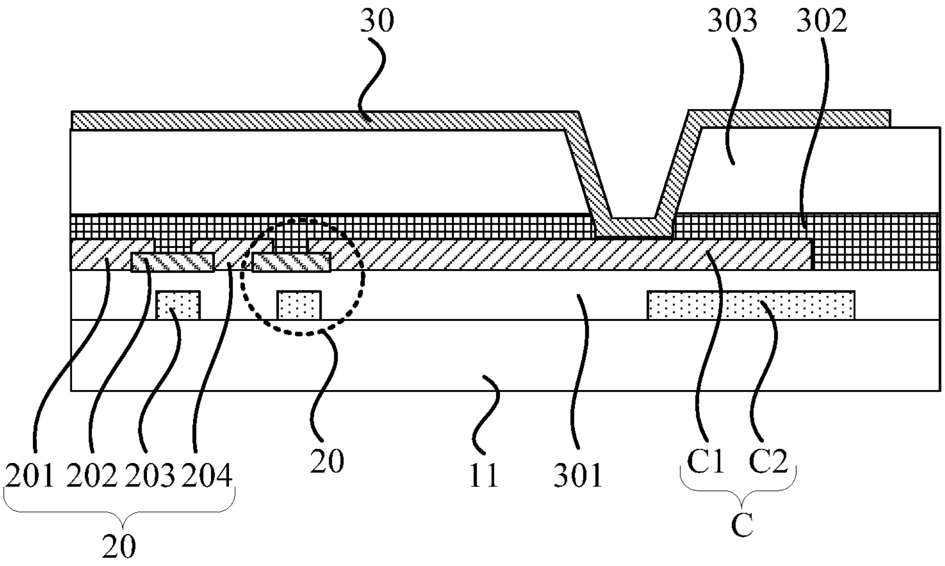
FIG. 2 is a section view of a display panel according to an embodiment of the present disclosure.
Figure 3:
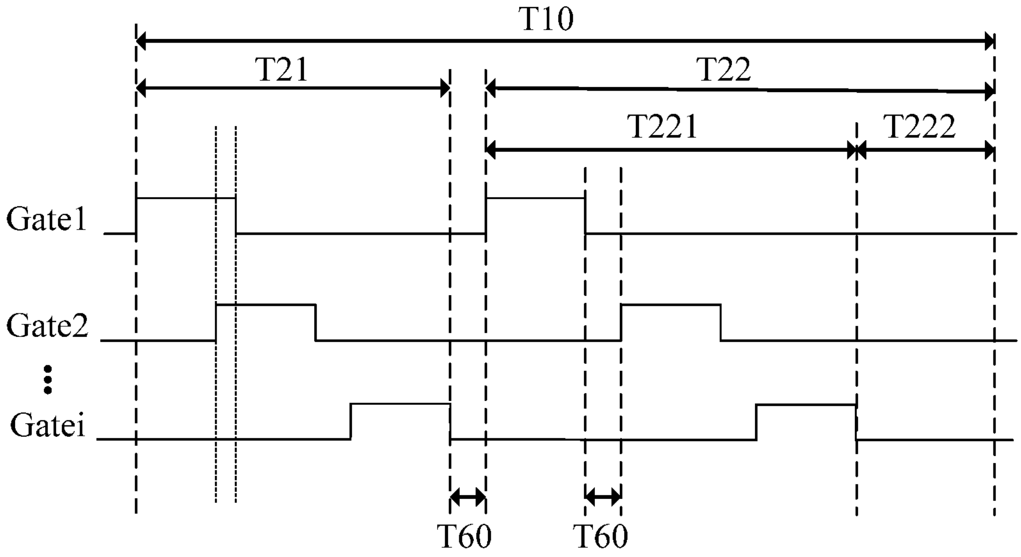
FIG. 3 is a drive timing diagram of a display panel according to an embodiment of the present disclosure.

FIG. 1 is a top diagram of a display panel according to an embodiment of the present disclosure, FIG. 2 is a section view of a display panel according to an embodiment of the present disclosure, and FIG. 3 is a drive timing diagram of a display panel according to an embodiment of the present disclosure. With reference to FIGS. 1 to 3, the display panel includes a plurality of scan lines 21 and a plurality of data lines 22. The scan line 21 is configured to transmit a scan signal (for example, a first scan signal Gate1, a second scan signal Gate2, . . . , and an $i^{th}$ scan signal Gatei, where i is a positive integer greater than 1). The scan signal includes a scan enable level and a scan non-enable level. In the time period where the scan enable level is located, the data signal may be written to a pixel electrode 30. In the time period where the scan non-enable level is located, the data signal cannot be written to the pixel electrode 30.

The data line 22 is configured to transmit a data signal, and the data signal includes a data enable level and a data non-enable level. The data enable level is a level that changes the display grayscale of a sub-pixel, and the data non-enable level is a level that does not change the display grayscale of a sub-pixel. In an embodiment, the data line 22 transmits a data non-enable level, and no voltage difference exists between the pixel electrode 30 and a common electrode COM, that is, the pixel electrode 30 has the same voltage as the common electrode COM. The data line 22 transmits a data enable level, and a non-zero voltage difference exists between the pixel electrode 30 and the common electrode COM. In another embodiment, the data line 22 transmits a data non-enable level, and the voltage difference between the pixel electrode 30 and the common electrode COM is within a threshold range. The data line 22 transmits a data enable level, and the voltage difference between the pixel electrode 30 and the common electrode COM exceeds the threshold range.

The display panel includes a display cycle T10. The display cycle T10 includes a display preparation stage T21 and a display stage T22, and the display preparation stage T22 is before the display stage T22. In the display preparation stage T21, the undifferentiated operation such as a reset operation is performed on all the sub-pixels. In one pixel group (including a first pixel group 401 and a second pixel group 402) extending in a first direction X, the pixel group includes a plurality of sub-pixels arranged in the first direction X, and the data line 22 connected to each sub-pixel transmits the same data signal. In the display preparation stage T21, each data line 22 transmits the same data signal. It is to be understood that in the display preparation stage T21, the undifferentiated operation performed on all the sub-pixels may also be embodied in different pixel groups, and the data lines 22 connected to the sub-pixels in different pixel groups transmit the same data signal. In the display stage T22, the differentiated operation is performed on at least two sub-pixels, thereby achieving the screen display. In one pixel group extending in the first direction X, data lines 22 connected to two sub-pixels transmit different data signals, respectively. In the display stage T22, each data line 22 transmits different data signals.

The display stage T22 includes a time period where the data enable level is located. In the display stage T22, the scan enable level transmitted on each scan line 21 has the same duration. The time periods where scan enable levels transmitted on different scan lines 21 are located are not overlapped. In the display stage T22, the data line 22 transmits the data enable level or the data non-enable level and transmits the data enable level or the data non-enable level to a pixel drive circuit, and the pixel drive circuit further controls the display grayscale of the sub-pixels according to the magnitude of the data enable level or according to the data non-enable level. Therefore, the display panel provided by the embodiments of the present disclosure performs data signal writing and light-emitting display in the display stage T22.

The scan line 21 extends in the first direction X and includes a first scan line 211 and a second scan line 212. The first scan line 211 is electrically connected to the first pixel group 401, and the second scan line 212 is electrically connected to the second pixel group 402. The first scan line 211 and the second scan line 212 are arranged in a second direction Y, and the second direction Y intersects the first direction X. The first direction X and the second direction Y may be perpendicular, or may not be perpendicular and have an included angle greater than 0 degrees and less than 90 degrees. It is to be noted that the first scan line 211 and the second scan line 212 may be adjacent or may not be adjacent in the second direction Y.

In the display preparation stage, the time period where the scan enable level transmitted on the first scan line 211 is located is at least partially overlapped with the time period where the scan enable level transmitted on the second scan line T212 is located.

For example, the first scan line 211 transmits the first scan signal Gate1, the second scan line 212 transmits the second scan signal Gate2, and an $i^{th}$ scan line 21 transmits the $i^{th}$ scan signal Gatei. In the display preparation stage T21, the scan enable level of the first scan signal Gate1 is at least partially overlapped with the scan enable level of the second scan signal Gate2. For the progressive scanning in the known techniques, the scan enable level of the second scan signal Gate2 is located after the scan enable level of the first scan signal Gate1, and the scan enable level of the second scan signal Gate2 is not overlapped with the scan enable level of the first scan signal Gate1. For the known techniques, in the display preparation stage T21, the scan enable level of the first scan signal Gate1 is at least partially overlapped with the scan enable level of the second scan signal Gate2, thereby reducing the duration of the display preparation stage T21.

The embodiments of the present disclosure provide a display panel. In the display preparation stage T21, time periods where scan enable levels transmitted on at least two scan lines 21 are located are at least partially overlapped. The scan enable levels transmitted on different scan lines 21 may occur in the same time period, thereby reducing the duration of the display preparation stage and reducing the duration of the screen refresh.

In one embodiment with reference to FIG. 1, the plurality of scan lines 21 extend in the first direction X and are arranged in the second direction Y, and the plurality of data lines 22 extend in the second direction Y and are arranged in the first direction X. It is to be understood that the extension directions of the scan lines 21 and the data lines 22 are interchangeable, that is, in other embodiments, the plurality of scan lines 21 extend in the second direction Y and are arranged in the first direction X, and the plurality of data lines 22 extend in the first direction X and are arranged in the second direction Y.

In one embodiment, with reference to FIG. 1, the display panel further includes a first substrate 11, and the scan lines 21 and the data lines 22 are located on the first substrate 11. In other embodiments, at least one of the scan lines 21 or the data lines 22 may also be located on another substrate.

Figure 23:
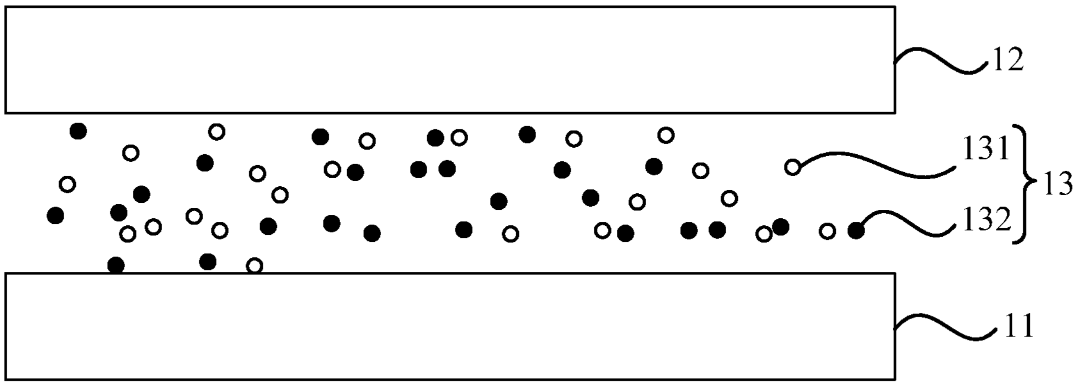
FIG. 23 is another section view of a display panel according to an embodiment of the present disclosure.

In one embodiment, with reference to FIG. 23, at least one of the scan lines 21 or the data lines 22 may be located on the second substrate 12, and the first substrate 11 is disposed opposite the second substrate 12.

In one embodiment, with reference to FIGS. 1 and 2, the display panel includes a pixel drive circuit, and the pixel drive circuit includes a first function transistor 20. The scan line 21 is electrically connected to the gate of the first functional transistor 20 and is configured to control on or off of the first functional transistor 20. When the scan line 21 transmits the scan enable level, the first functional transistor 20 is on, and the data enable level or data non-enable level transmitted by the data line 22 is transmitted to the pixel electrode 30 through the first function transistor 20 that is on. When the scan line 21 transmits the scan non-enable level, the first functional transistor 20 is off.

In one embodiment, with reference to FIG. 2, the pixel driver circuit further includes a storage capacitor C. The first plate C1 of the storage capacitor C is disposed in the same layer as the source 201 and drain 204 of the first functional transistor 20, and the second plate C2 of the storage capacitor C is disposed in the same layer as the gate 203 of the first functional transistor 20. The first plate C1 of the storage capacitor C is electrically connected to the drain 204 of the first functional transistor 20, and the first plate C1 of the storage capacitor C is also electrically connected to the pixel electrode 30, and the storage capacitor C is mainly used to keep the charged voltage until the next screen update. It is to be understood that the source 201 and drain 204 of the first functional transistor 20 can be used interchangeably.

In one embodiment, with reference to FIG. 2, the display panel further includes a gate insulating layer 301, a passivation layer 302, and a planarization layer 303. The gate insulating layer 301 is between the gate 203 and the source 201. The source 201 and the drain 204 are disposed in the same layer and stacked on a semiconductor layer 202. The passivation layer 302 is between the planarization layer 303 and the source 301, and the planarization layer 303 is between the pixel electrode 30 and the passivation layer 302. The pixel electrode 30 is electrically connected to the drain 204 through a via that penetrates through the planarization layer 303 and the passivation layer 302.

For the sake of simplicity, one first functional transistor 20 is illustrated in one pixel drive circuit in FIG. 1. One pixel drive circuit may include two first functional transistors 20 that are connected in series. With reference to FIG. 2, the display is controlled and achieved through two series-connected first functional transistors 20, and the two series-connected first functional transistors 20 can reduce the leakage current, thereby improving the display quality. The two series-connected first function transistors 20 are formed into one double-gate transistor.

Figure 4:
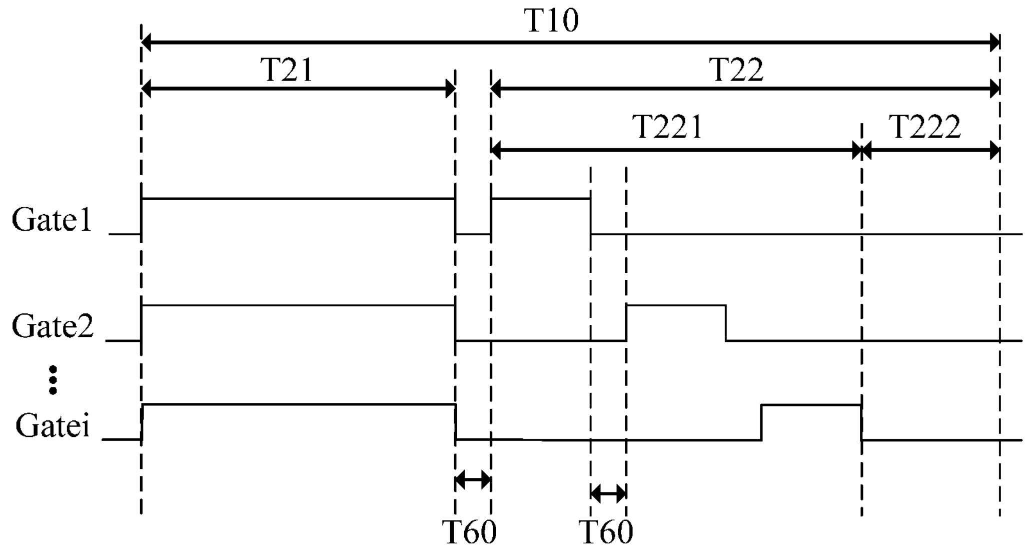
FIG. 4 is another drive timing diagram of a display panel according to an embodiment of the present disclosure.

FIG. 4 is another drive timing diagram of a display panel according to an embodiment of the present disclosure. With reference to FIGS. 1 and 4, in the display preparation stage T21, the time period where the scan enable level transmitted on the first scan line 211 is located is the same as the time period where the scan enable level transmitted on the second scan line 212 is located. That is, at least two scan lines 21 transmit the scan enable level in the same time period. Therefore, the duration occupied by the scan enable levels of two scan signals that transmit the scan enable levels in the same time period becomes half of that in the known techniques, thereby reducing the duration of the display preparation stage and reducing the duration of the screen refresh.

In the known techniques, for the progressive scanning in the display preparation stage T21, after the operation (for example, a reset operation) is completed in the time period where the scan enable level transmitted on the first scan line 211 is located, the operation is completed in the time period where the scan enable level transmitted on the second scan line 212 is located. The first scan line 211 and the second scan line 212 successively control the sub-pixels to complete the same operation in different time periods. The difference in time for the same operation will lead to the difference in the display effect. In the embodiments of the present disclosure, the scan enable levels of at least two scan signals are transmitted in the same time period to reduce the time difference for the same operation, that is, in the display preparation stage T21, the undifferentiated operation is performed on all the sub-pixels in the same time period as far as possible, thereby facilitating the display uniformity.

Figure 5:
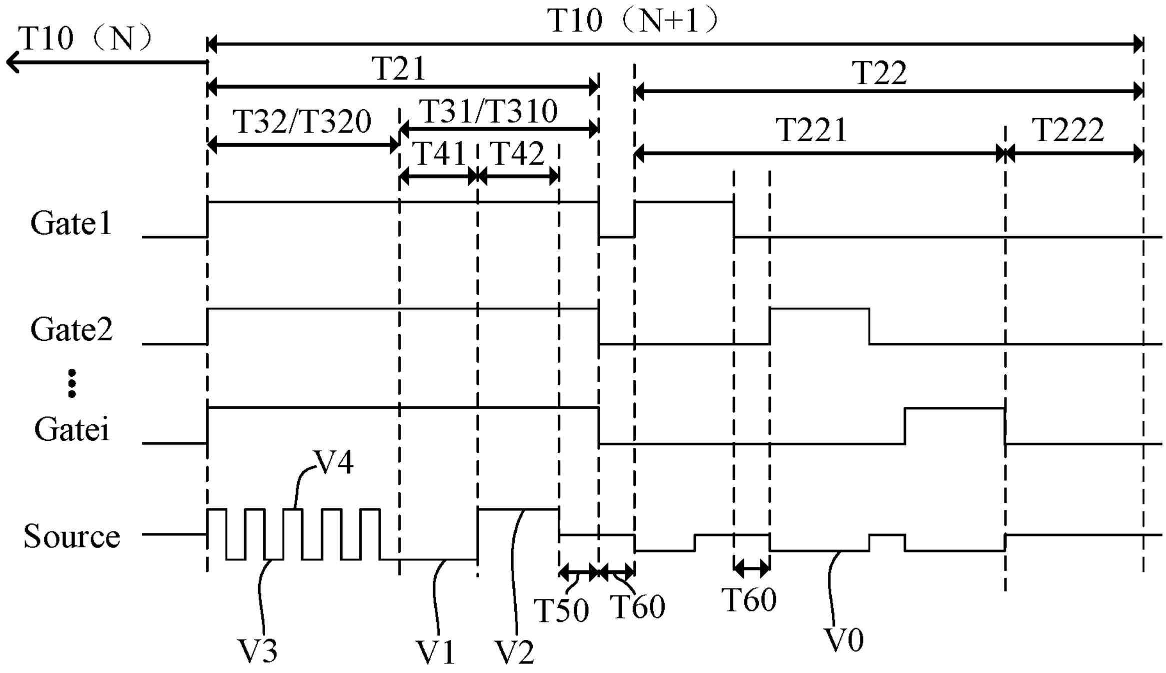
FIG. 5 is another drive timing diagram of a display panel according to an embodiment of the present disclosure.

FIG. 5 is another drive timing diagram of a display panel according to an embodiment of the present disclosure. With reference to FIG. 5, the display preparation stage T21 includes a reset stage T31 and an oscillation stage T32. In the same display cycle T10, the write frequency of an enable level of the data signal Source in the oscillation stage T32 is greater than the write frequency of an enable level of the data signal Source in the reset stage T31. The write frequency of the enable level refers to the number of times the enable level is written per unit time.

In one embodiment, the display panel is an electrophoretic display panel, and the display panel includes an electrophoretic particle. In the reset stage T31, the write frequency of the enable level is low, and the change frequency of the voltage is low. In this manner, sufficient movement time is provided for the electrophoretic particles so that electrophoretic particles move to a preset position under the control of an electric field for a long time, thereby reducing the difference between display grayscales of all the sub-pixels. For example, after the reset, the display panel displays a white background or a black background. In the oscillation stage T32, the write frequency of the enable level is high, and the change frequency of the voltage is high so that the electrophoretic particles with different charges can be separated from each other in an electric field with high frequency change, thereby preventing the electrophoretic particles with different charges from agglomerating.

In other embodiments, the display preparation stage T21 may include only one of the reset stage T31 or the oscillation stage T32.

In one embodiment, with reference to FIG. 5, the display preparation stage T21 includes a reset stage T31, and the reset stage T31 includes at least one sub-reset stage T310 (for example, in FIG. 5, the reset stage T31 includes one sub-reset stage T310). The data enable level includes a first data enable level V1 and a second data enable level V2, and the polarity of the first data enable level V1 is opposite to the polarity of the second data enable level V2. The sub-reset stage T310 includes one time period T41 where the first data enable level V1 is located and one time period T42 where the second data enable level V2 is located. In other embodiments, the sub-reset stage T310 may further include one time period T41 where the first data enable level V1 is located or one time period T42 where the second data enable level V2 is located.

In one embodiment, with reference to FIG. 5, the data enable level is not equal to 0 V, and the data non-enable level is equal to 0 V. The first data enable level V1 is less than 0 V, and the second data enable level V2 is greater than 0 V. The first data enable level V1 is configured to cause the display panel to display a black screen (that is, a black background), and the second data enable level V2 is configured to cause the display panel to display a white screen (that is, a white background). The voltage of negative polarity is the black writing process, and the voltage of positive polarity is the white writing process.

It is to be noted that the feature that the display screen caused by the positive and negative polarity of the data enable level is black or white is also related to the polarity of particles. That is, at the same voltage polarity, the screens caused by black particles of positive polarity and black particles of negative polarity are different.

Figure 6:
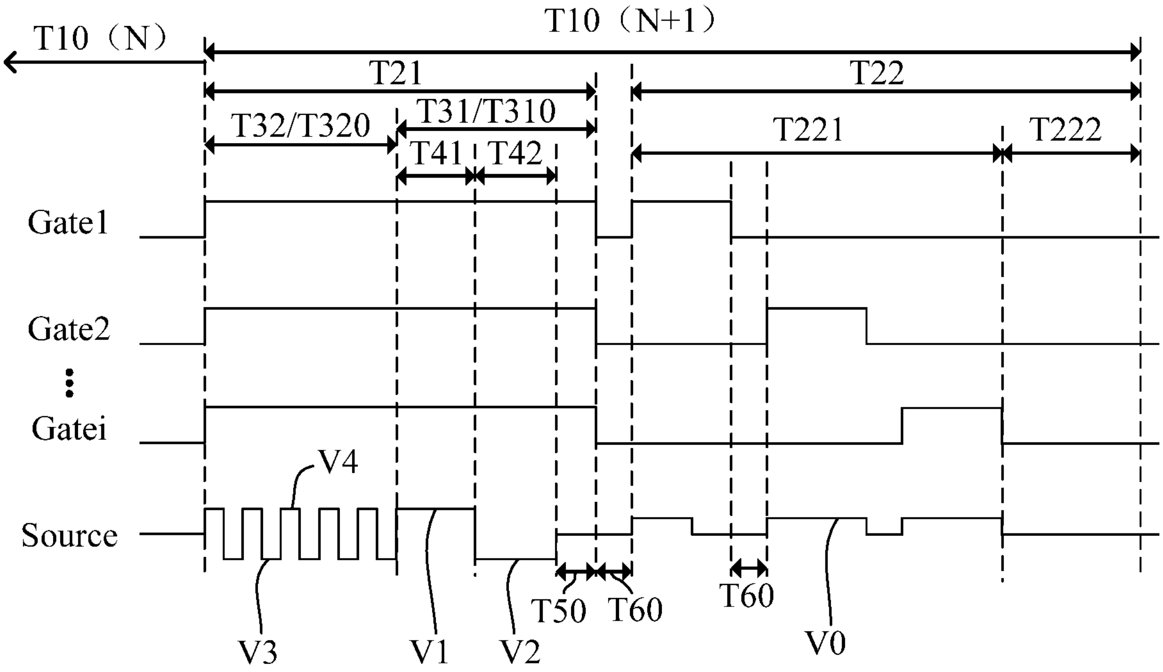
FIG. 6 is another drive timing diagram of a display panel according to an embodiment of the present disclosure.

FIG. 6 is another drive timing diagram of a display panel according to an embodiment of the present disclosure. With reference to FIG. 6, the first data enable level V1 is greater than 0 V, and the second data enable level V2 is less than 0 V. The first data enable level V1 is configured to cause the display panel to display a black screen (that is, a black background), and the second data enable level V2 is configured to cause the display panel to display a white screen (that is, a white background). The voltage of positive polarity is the black writing process, and the voltage of negative polarity is the white writing process.

It is to be understood that when the screen displayed on the display panel is reset, the resulting screen is not limited to the black screen and the white screen, and the color of the resulting screen is determined by the color, polarity and type of particles. In other embodiments, the resulting screen after the screen displayed on the display panel is reset may also include a brown screen and a white screen.

In one embodiment, with reference to FIGS. 1 and 5, the display stage T22 includes a first sub-display stage T221 and a second sub-display stage T222. The first sub-display stage T221 is between the display preparation stage T21 and the second sub-display stage T222. In the first sub-display stage T221, the time periods where the scan enable levels transmitted on two scan lines 21 are located are not overlapped. The time period where the scan enable level transmitted on each scan line 21 is located is arranged sequentially at intervals. In the first sub-display stage T221, in the time period where the scan enable level is located, the data line 22 transmits at least one of the data enable level or the data non-enable level, at least one of the data enable level or the data non-enable level is written to the pixel drive circuit, and the pixel drive circuit controls the display grayscale of the sub-pixels according to the magnitude of the data enable level or according to the data non-enable level. In the second sub-display stage T221, the display panel can be powered off for display, that is, no data signal and scan signal are applied; or the scan non-enable level is applied to the scan line 21; or the data non-enable level is applied to the data line 22. Specifically, the data non-enable level may be applied to the data line 22 in the following manner: the data line 22 is floated, or the same voltage as the common electrode COM is applied to the data line 22 so that no voltage difference exists between the common electrode COM and the pixel electrode 30.

It is to be understood that in the first sub-display stage T221, while the data signal is written progressively, the pixel drive circuit to which the data signal is written controls the sub-pixels to emit light. In the second sub-display stage T221, the pixel drive circuits of all lines of the entire display panel are written with the data signals, and all the sub-pixels in the display panel emit light under the control of the pixel driving circuits. The present disclosure does not limit the relationship between the duration of the first sub-display stage T221 and the duration of the second sub-display stage T221. The duration of the first sub-display stage T221 may be greater than or less than the duration of the second sub-display stage T221.

In one embodiment, with reference to FIG. 5, the voltage of the data signal Source is partly a data enable level and partly a data non-enable level in the time period where the scan enable level of the first scan signal Gate1 is located.

In one embodiment, with reference to FIGS. 1 and 5, in the sub-reset stage T310, the time period where the scan enable level transmitted on the first scan line 211 is located is overlapped with the time period where the scan enable level transmitted on the second scan line T212 is located. The scan enable levels transmitted on different scan lines 21 may occur in the same time period, thereby reducing the duration of the sub-reset stage T310, reducing the duration of the reset stage T31, and reducing the duration of the display preparation stage T21.

In one embodiment, with reference to FIG. 5, the display preparation stage T21 also includes an oscillation stage T32. The oscillation stage T32 includes at least one sub-oscillation stage T320 (for example, in FIG. 5, the oscillation stage T32 includes one sub-oscillation stage T320). The data enable level includes a third data enable level V3 and a fourth data enable level V4, and the polarity of the third data enable level V3 is opposite to the polarity of the fourth data enable level V4. The sub-oscillation stage T320 includes a plurality of time periods where the third data enable level V3 is located and a plurality of time periods where the fourth data enable level V4 is located. The time period where the third data enable level V3 is located is adjacent to the time period where the fourth data enable level V4 is located. One time period where the fourth data enable level V4 is located is spaced between two time periods where the third data enable level V3 is located, and one time period where the third data enable level V3 is located is spaced between two time periods where the fourth data enable level V4 is located.

In one embodiment, with reference to FIGS. 1 and 5, in the sub-oscillation stage T320, the time period where the scan enable level transmitted on the first scan line 211 is located is overlapped with the time period where the scan enable level transmitted on the second scan line T212 is located. The scan enable levels transmitted on different scan lines 21 may occur in the same time period, thereby reducing the duration of the sub-oscillation stage T320, reducing the duration of the oscillation stage T32, and reducing the duration of the display preparation stage T21.

In one embodiment, with reference to FIGS. 1 and 5, in the same display cycle T10, the duration of the oscillation stage T32 is less than the duration of the reset stage T31.

In one embodiment, with reference to FIG. 5, in the reset stage T31, the time period T41 is a balance time period, and the polarity of the data enable level in the balance time period is the same as the polarity of the data enable level in the display stage T22 in the previous display cycle T10. The balance time period is used to balance the previous display cycle T10. The balance time period will be described in detail later. Since the reset stage T31 includes the balance time period, the reset stage T31 has a longer duration than the oscillation stage T32.

In one embodiment, with reference to FIGS. 4 and 5, the display preparation stage T21 includes a time period where the scan enable level is located. For one scan signal, the display preparation stage T21 includes one scan signal pulse, and the number of switches between the high level and the low level in the scan signal is minimized, thereby facilitating the reduction of the power consumption of the display panel.

Figure 7:
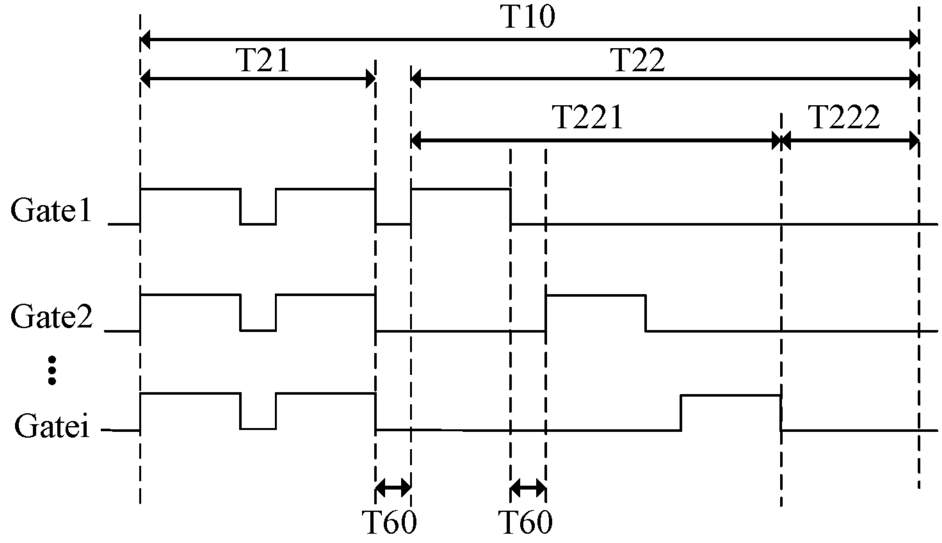
FIG. 7 is another drive timing diagram of a display panel according to an embodiment of the present disclosure.

FIG. 7 is another drive timing diagram of a display panel according to an embodiment of the present disclosure. With reference to FIGS. 1 and 7, in the display preparation stage T21, the display preparation stage T21 includes a plurality of time periods where the scan enable level are located. For one scan signal, the display preparation stage T21 includes at least two scan signal pulses, thereby reducing the duration of a single scan enable level. For a shift register (not shown in FIG. 1) which supplies the scan signal to the scan line 21, the voltage at the output terminal of the shift register is not kept at a high level for a long period of time, thereby reducing the offset caused by the output voltage of the shift register, improving the stability of the output voltage of the shift register, and improving the stability of the scan signal. The shift register may be disposed in the driver chip.

In one embodiment, with reference to FIG. 7, in the display preparation stage T21, the first scan signal Gate1 includes two time periods where the scan enable level is located, the second scan signal Gate2 includes two time periods where the scan enable level is located, and the $i^{th}$ scan signal Gatei includes two time periods where the scan enable level is located. It is to be noted that the embodiments of the present disclosure do not limit the number of scan enable levels transmitted on one scan line 21 in the display preparation stage T21.

In one embodiment, with reference to FIG. 7, the duration of one scan enable level in the display preparation stage T21 is equal to the duration of one scan enable level in the display stage T22. Therefore, the scan enable level in the display preparation stage T21 and the scan enable level in the display stage T22 can be generated by the same set of shift registers, and a plurality of different sets of shift registers do not need to be set, thereby simplifying the setting of the shift registers.

Figure 8:
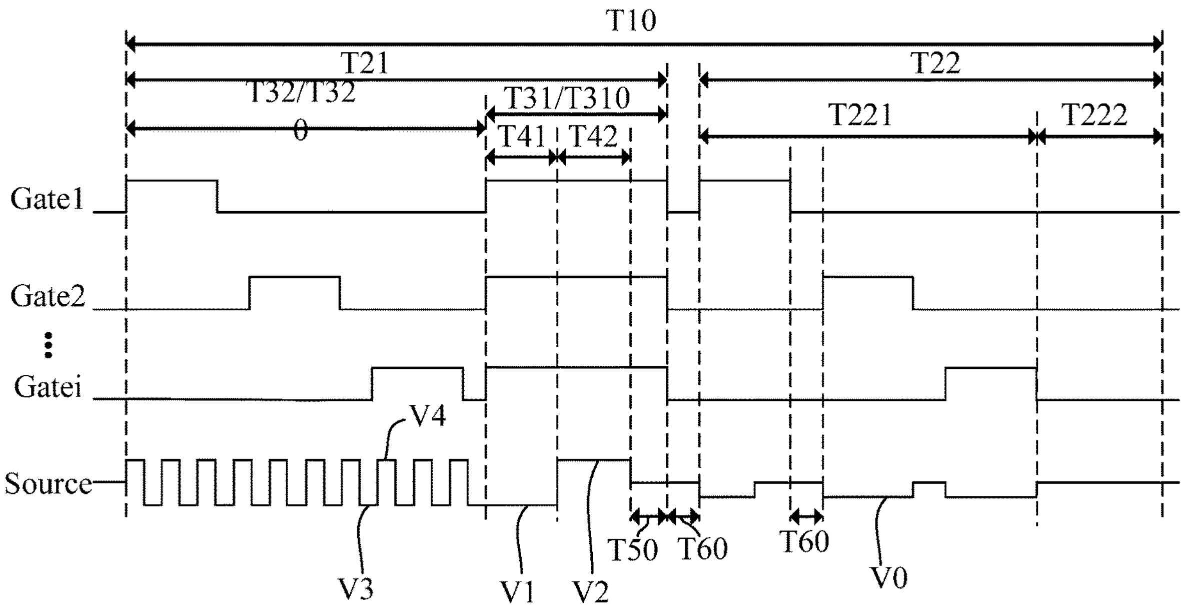
FIG. 8 is another drive timing diagram of a display panel according to an embodiment of the present disclosure.

FIG. 8 is another drive timing diagram of a display panel according to an embodiment of the present disclosure. With reference to FIGS. 1 and 8, the reset stage T31 and the oscillation stage T32 each include at least one time period where the scan enable level is located. The duration of the scan enable level in the reset stage T31 does not exceed the duration of the reset stage T31. The duration of the scan enable level in the oscillation stage T32 does not exceed the duration of the oscillation stage T32. Therefore, the duration of a single scan enable level is reduced.

In one embodiment, with reference to FIG. 8, in the reset stage T31, the first scan signal Gate1 includes one scan enable level. In the oscillation stage T32, the first scan signal Gate1 includes one scan enable level. Similarly, in the reset stage T31, the second scan signal Gate2 includes one scan enable level. In the oscillation stage T32, the second scan signal Gate2 includes one scan enable level.

In one embodiment, with reference to FIGS. 1 and 8, in the reset stage T31, the time periods where the scan enable levels transmitted on any two scan lines 21 are located are the same. In the oscillation stage T32, the time periods where the scan enable levels transmitted on two scan lines 21 are located are not overlapped. The time period where the scan enable level transmitted on each scan line 21 is located is arranged sequentially at intervals. In the embodiments of the present disclosure, the duration of the reset stage T31 is reduced, the duration of the oscillation stage T32 is unchanged, thereby reducing the duration of the display preparation stage T21 as a whole.

Figure 9:
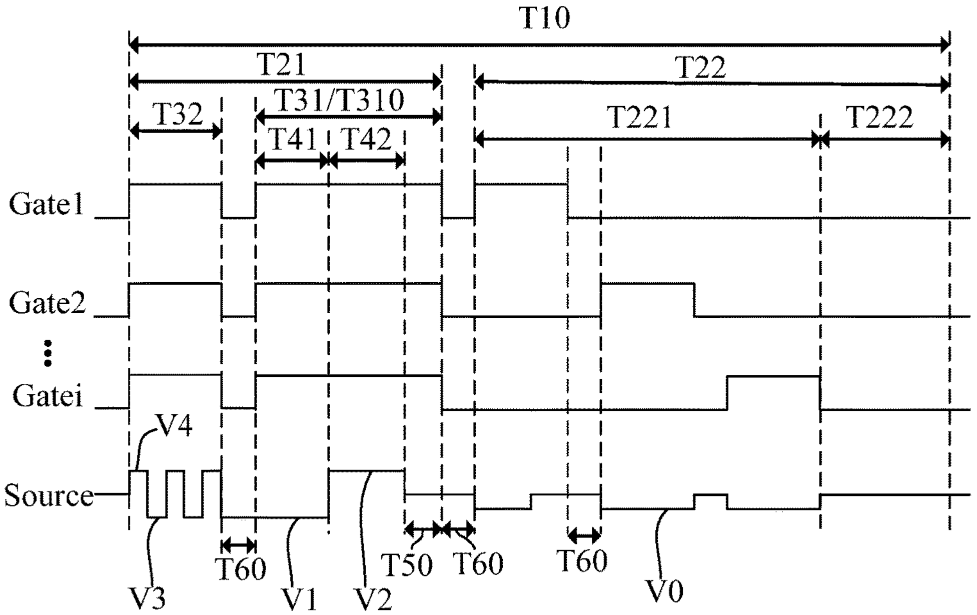
FIG. 9 is another drive timing diagram of a display panel according to an embodiment of the present disclosure.

FIG. 9 is another drive timing diagram of a display panel according to an embodiment of the present disclosure. With reference to FIGS. 1 and 9, the reset stage T31 includes one time period where the scan enable level is located. The oscillation stage T32 includes one time period where the scan enable level is located. In the reset stage T31, the time periods where the scan enable levels transmitted on any two scan lines 21 are located are the same. In the oscillation stage T32, the time periods where the scan enable levels transmitted on any two scan lines 21 are located are the same.

Figure 10:
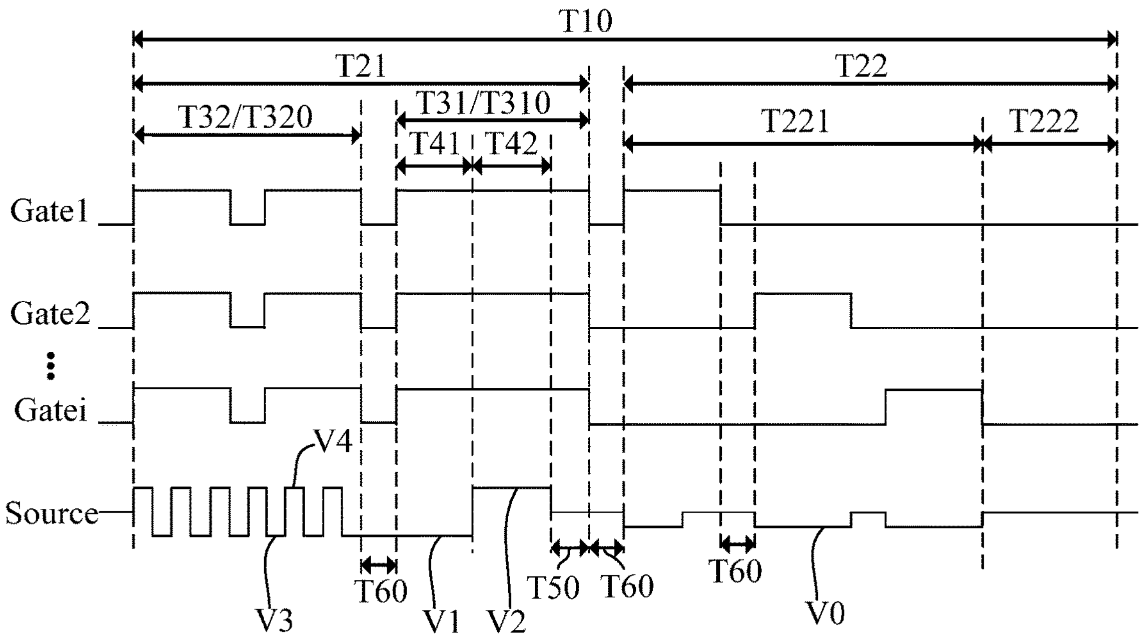
FIG. 10 is another drive timing diagram of a display panel according to an embodiment of the present disclosure.

FIG. 10 is another drive timing diagram of a display panel according to an embodiment of the present disclosure. With reference to FIGS. 1 and 10, the reset stage T31 includes one time period where the scan enable level is located. The oscillation stage T32 includes a plurality of time periods where the scan enable level is located. In the oscillation stage T32, any two scan lines 21 transmit the scan enable level in the same time period, and all the scan lines 21 transmit the scan enable level simultaneously.

In other embodiments, the reset stage T31 includes a plurality of time periods where the scan enable level is located. The oscillation stage T32 includes one time period where the scan enable level is located.

Figure 11:
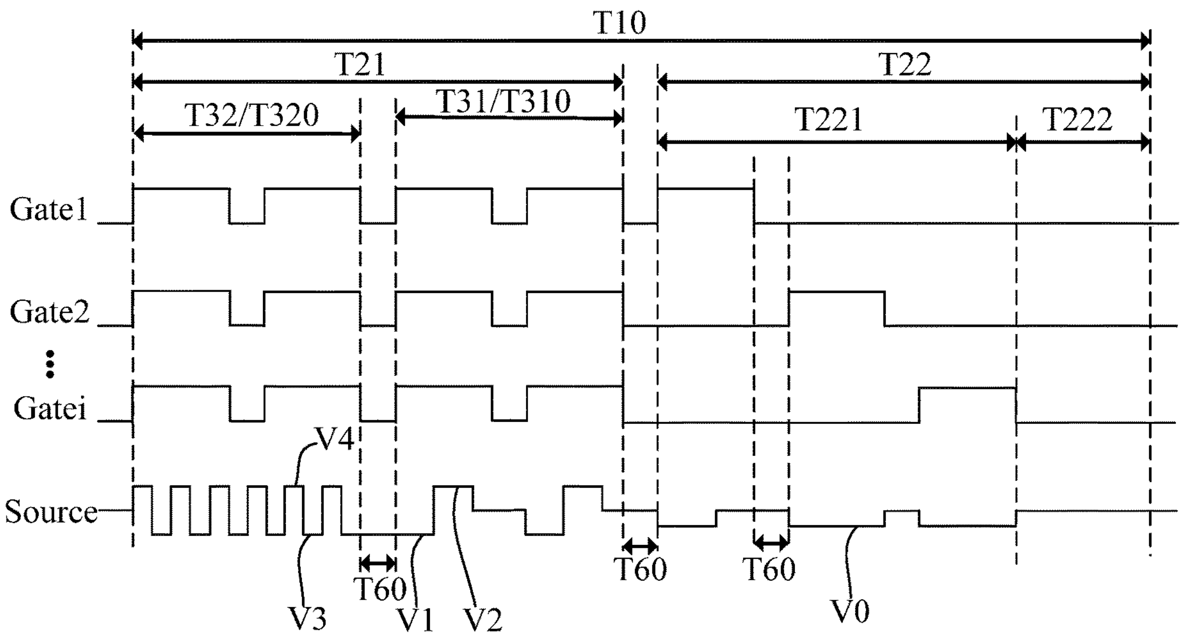
FIG. 11 is another drive timing diagram of a display panel according to an embodiment of the present disclosure.

FIG. 11 is another drive timing diagram of a display panel according to an embodiment of the present disclosure. With reference to FIGS. 1 and 11, the reset stage T31 includes a plurality of time periods where the scan enable level is located. The oscillation stage T32 includes a plurality of time periods where the scan enable level is located. The duration of the scan enable level in the reset stage T31 does not exceed half of the duration of the reset stage T31. The duration of the scan enable level in the oscillation stage T32 does not exceed half of the duration of the oscillation stage T32. Therefore, the duration of a single scan enable level is reduced. In the reset stage T31 and the oscillation stage T32, any two scan lines 21 transmit the scan enable level in the same time period, and all the scan lines 21 transmit the scan enable level simultaneously.

In one embodiment, with reference to FIG. 5, in the same display cycle T10, the reset stage T31 is between the oscillation stage T32 and the display stage. In the same display cycle T10, the oscillation stage T32 is before the reset stage T31, and the reset stage T31 is before the display stage T22. In the embodiments of the present disclosure, the agglomeration of electrophoretic particles with different charges is eliminated, and then the electrophoretic particles move to a preset position so that all sub-pixels have the same display grayscale. When the reset stage T31 is between the oscillation stage T32 and the display stage, the voltage of the current display cycle T10 is mainly balanced, and the voltage of the previous display cycle T10 may also be balanced.

Figure 12:
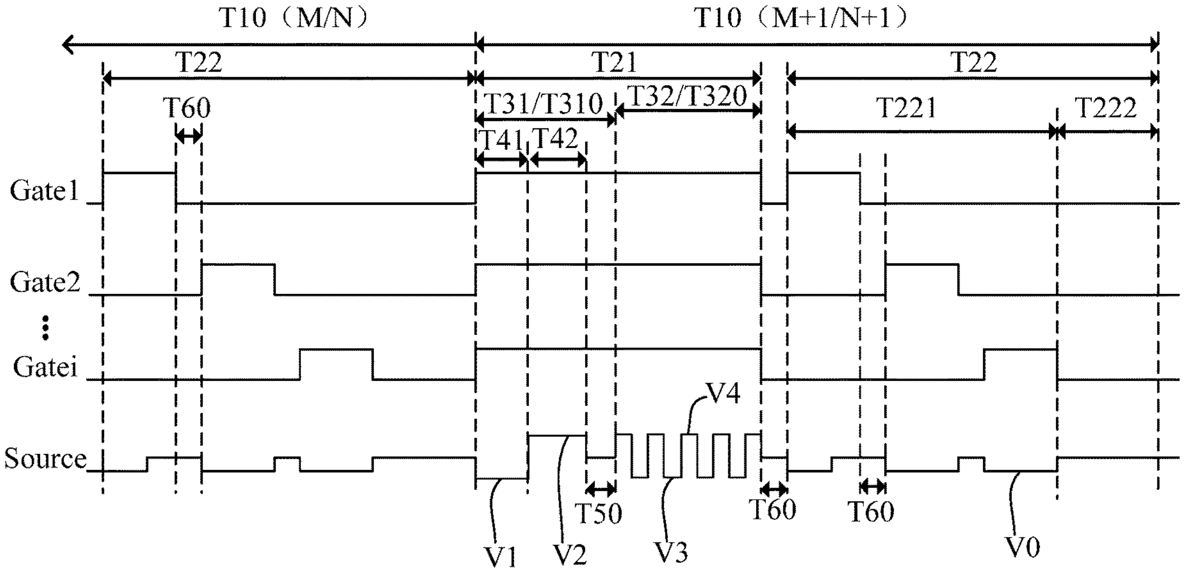
FIG. 12 is another drive timing diagram of a display panel according to an embodiment of the present disclosure.

FIG. 12 is another drive timing diagram of a display panel according to an embodiment of the present disclosure. With reference to FIG. 12, in the same display cycle T10, the oscillation stage T32 is between the reset stage T31 and the display stage T22. In the same display cycle T10, the reset stage T31 is before the oscillation stage T32, and the oscillation stage T32 is before the display stage T22. In the embodiments of the present disclosure, the electrophoretic particles move to a preset position to ensure that all sub-pixels have the same display grayscale, and then the agglomeration of electrophoretic particles with different charges is eliminated. When the reset stage T31 is between the oscillation stage T32 and the display stage, the voltage of the previous display cycle T10 is mainly balanced, and the voltage of the current display cycle T10 may also be balanced.

In one embodiment, with reference to FIG. 12, the sub-reset stage T310 of an (M+1)th display cycle T10 is adjacent to the display stage T22 of an $M^{th}$ display cycle T10, and M is a positive integer. That is, after the display stage T22 in the $M^{th}$ display cycle T10, the stage adjacent to the display stage T22 in the $M^{th}$ display cycle T10 is the sub-reset stage T310.

In one embodiment, with reference to FIG. 12, in an $(N+1)^{th}$ display cycle T10, the sub-reset stage T310 that is the closest in time distance to the display stage T22 in an $N^{th}$ display cycle T10 includes a balance time period, and N is a positive integer. The polarity of the data enable level in the balance time period of the $(N+1)^{th}$ display cycle T10 is the same as the polarity of the data enable level in the display stage T22 of the $N^{th}$ display cycle T10.

In one embodiment, with reference to FIG. 5, the sub-reset stage T310 of the (N+1)th display cycle T10 is not adjacent to the display stage T22 of the $N^{th}$ display cycle T10, and the sub-oscillation stage T32 is spaced between the sub-reset stage T310 of the $(N+1)^{th}$ display cycle T10 and the display stage T22 of the $N^{th}$ display cycle T10. With reference to FIG. 12, when the sub-reset stage T310 is adjacent to the display stage T22 in the previous display cycle T10, two equivalent manners may be used to express. One expression manner is that the sub-reset stage T310 of the $(N+1)^{th}$ display cycle T10 is adjacent to the display stage T22 of the $N^{th}$ display cycle T10. The other expression manner is that the sub-reset stage T310 of the $(M+1)^{th}$ display cycle T10 is adjacent to the display stage T22 of the $M^{th}$ display cycle T10. Therefore, when the sub-reset stage T310 of the $(M+1)^{th}$ display cycle T10 is adjacent to the display stage T22 of the $M^{th}$ display cycle T10, N and M may be regarded as the same value.

In one embodiment, with reference to FIG. 12, the polarity of the data enable level in the display stage T22 of the $N^{th}$ display cycle T10 is negative, that is, the data enable level in the display stage T22 of the $N^{th}$ display cycle T10 is a negative voltage. The following is described using an example where electrophoretic particles include black electrophoretic particles and white electrophoretic particles. In the display stage T22 of the $N^{th}$ display cycle T10, the white electrophoretic particles move in a direction away from the display side, the black electrophoretic particles move in a direction towards the display side, and in this manner, the display screen of the display panel shows that black words are written on the white background. The polarity of the data enable level in the balance time period of the $(N+1)^{th}$ display cycle T10 is negative. In the balance time period of the $(N+1)^{th}$ display cycle T10, the white electrophoretic particles move in the direction away from the display side, and the black electrophoretic particles continue to move in the direction towards the display side until the display panel a black screen (that is, the black background). Therefore, the balance time period continues the black writing process of the previous display cycle T10 and continues the black writing until the display panel displays a black screen. In other embodiments, the balance time period continues the white writing process of the previous display cycle T10 and continues the white writing until the display panel displays a white screen. In a word, the balance time period continues the polarity of the data enable level in the display stage T22 in the previous display cycle T10 and continues the moving direction of the electrophoretic particles in the display stage T22 in the previous display cycle T10, thereby achieving reset. After the reset, the electrophoretic particles can move from the same state starting point.

In one embodiment, with reference to FIGS. 1 and 12, the sub-reset stage T310 further includes a trim time period T50. In the trim time period T50, the data line 22 transmits the data non-enable level. No electric field driving electrophoretic particles to move is formed between the pixel electrode 30 and the common electrode COM. Since an electric field is formed between the pixel electrode 30 and the common electrode COM in the time period when the data line 22 transmits the data enable level, the electrophoretic particles are driven by the electric field to move. The particles need a buffer time to switch from motion to rest. The setting of the trim time period T50 provides a buffer time for the particles to switch from motion to rest. In another aspect, the timing period T50 is configured to trim the duration of the sub-reset stage T310, that is, to complement the duration of the sub-reset stage T310 so that the duration of the sub-reset stage T310 satisfies the pulse cycle of the driver chip.

In one embodiment, with reference to FIG. 12, in the $(N+1)^{th}$ display cycle T10, the sub-reset stage T310 that is the closest in time distance to the display stage T22 in the $N^{th}$ display cycle T10 includes a trim time period T50. In the $(N+1)^{th}$ display cycle T10, the sub-reset stage T310 that is the closest in time distance to the display stage T22 in the $N^{th}$ display cycle T10 includes a balance time period. The balance time period (time period T41) and the trim time period T50 are located in the same sub-reset stage T310.

It is to be noted that the above embodiments are described using an example where the reset stage T31 includes one sub-reset stage T310, and the oscillation stage T32 includes one sub-oscillation stage T320 as an example, but are not limited thereto. In other embodiments, the reset stage T31 may include a plurality of sub-reset stages T310 and/or the oscillation stage T32 may include a plurality of sub-oscillation stages T320.

Figure 13:
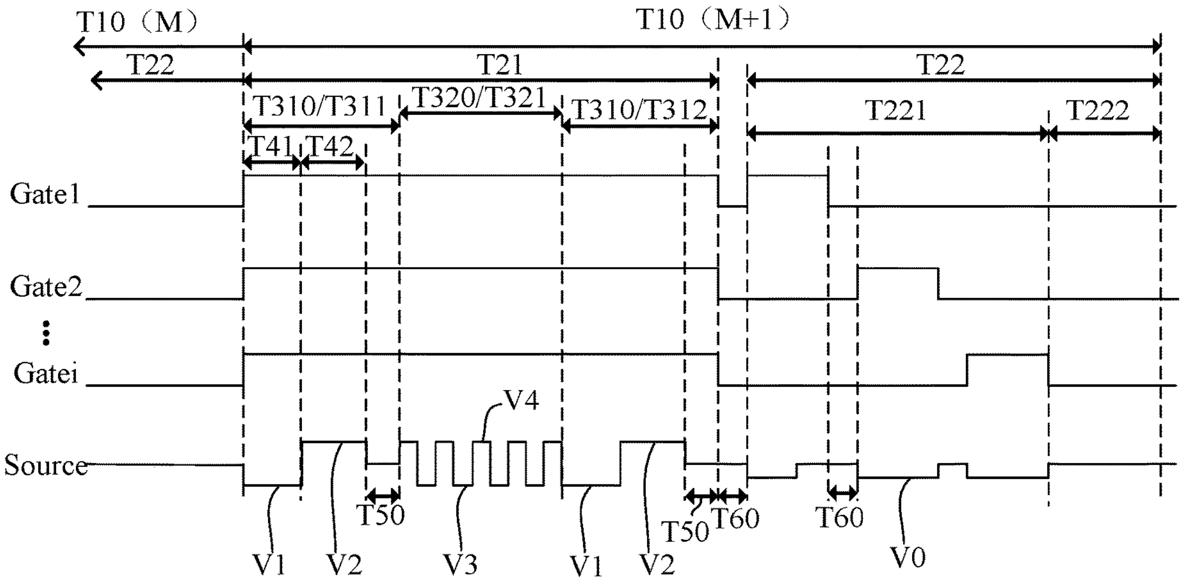
FIG. 13 is another drive timing diagram of a display panel according to an embodiment of the present disclosure.

FIG. 13 is another drive timing diagram of a display panel according to an embodiment of the present disclosure. With reference to FIG. 13, the sub-reset stage T310 includes a first sub-reset stage T311 and a second sub-reset stage T312. The sub-oscillation stage T320 includes a first sub-oscillation stage T321. In the same display preparation stage T21, the first sub-oscillation stage T321 is between the first sub-reset stage T311 and the second sub-reset stage T312, and the second sub-reset stage T312 is between the first sub-oscillation stage T321 and the display stage T22. In the embodiments of the present disclosure, the sub-reset stage T310 and the sub-oscillation stage T320 are combined so that the process where all the sub-pixels have the same display grayscale and the process where the agglomeration of electrophoretic particles with different charges is eliminated are alternately carried out for a plurality of cycles. After the reset, the electrophoretic particles can move from the same state starting point.

In one embodiment, with reference to FIG. 13, the sub-reset stage T310 in the $(N+1)^{th}$ display cycle T10 includes a first sub-reset stage T311 and a second sub-reset stage T312, and the first sub-reset stage T311 in the $(N+1)^{th}$ display cycle T10 is the closest in time distance to the display stage T22 in the $N^{th}$ display cycle T10. The first sub-reset stage T311 is adjacent to the display stage T22 in the $N^{th}$ display cycle T10.

In one embodiment, with reference to FIG. 13, the first sub-reset stage T311 in the $(N+1)^{th}$ display cycle T10 includes a balance time period. The polarity of the data enable level in the balance time period of the $(N+1)^{th}$ display cycle T10 is the same as the polarity of the data enable level in the display stage T22 of the $N^{th}$ display cycle T10.

In one embodiment, with reference to FIG. 13, the first sub-reset stage T311 in the $(N+1)^{th}$ display cycle T10 includes a trim time period T50. The second sub-reset stage T312 in the $(N+1)^{th}$ display cycle T10 includes a trim time period T50.

In one embodiment, with reference to FIG. 13, in the same display cycle T10, the sub-reset stage T310 is adjacent to the display stage T22. In the same display cycle T10, the sub-reset stage T310 is the closest in time distance to the display stage T22. In the time period immediately before the display, the reset is performed so that the electrophoretic particles can move from the same state starting point in the display stage T22, thereby improving the display quality.

In one embodiment, with reference to FIG. 13, in the same display cycle T10, the number of sub-reset stages T310 is greater than the number of sub-oscillation stages T320. The sub-oscillation stage T320 is configured to activate electrophoretic particles to prevent the electrophoretic particles with different charges from agglomerating. The appropriate reduction of the number of sub-oscillation stages T320 does not affect the display effect of the display panel and can reduce the duration of the oscillation stage T32.

In one embodiment, with reference to FIG. 13, in the first sub-reset stage T311 in the $(N+1)^{th}$ display cycle T10, the data enable level includes a first data enable level V1 and a second data enable level V2, and the polarity of the first data enable level V1 is opposite to the polarity of the second data enable level V2. The display panel is reset to display a black screen in the time period where the first data enable level V1 is located. The display panel is reset to display a white screen in the time period where the second data enable level V2 is located. In the second sub-reset stage T312 in the $(N+1)^{th}$ display cycle T10, the data enable level includes a first data enable level V1 and a second data enable level V2, and the polarity of the first data enable level V1 is opposite to the polarity of the second data enable level V2. Once again, the display panel achieves the display the white screen and the black screen.

Figure 14:
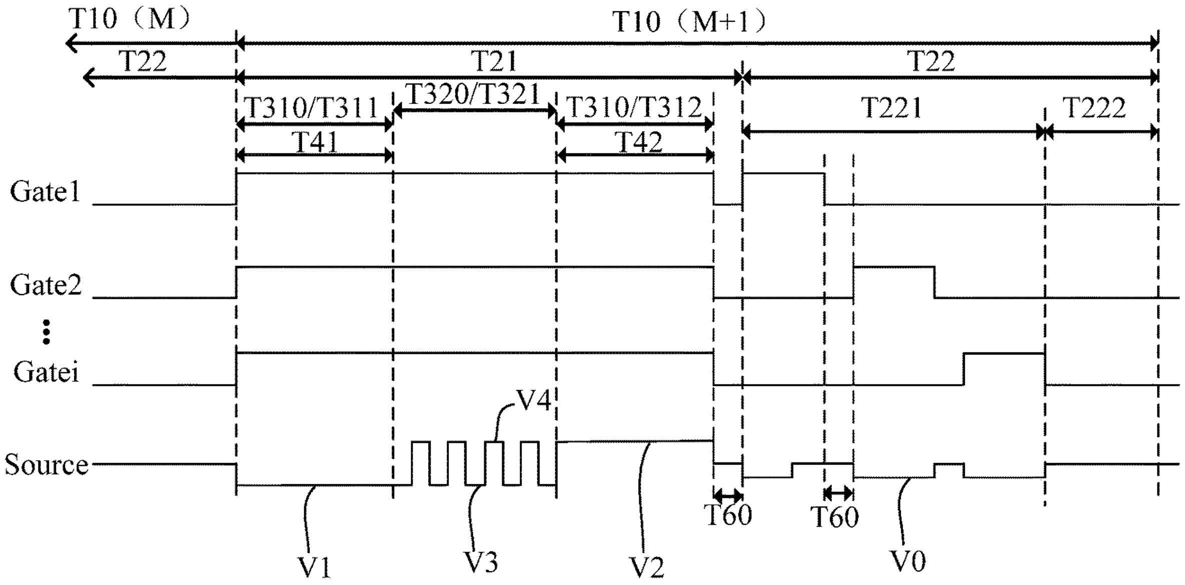
FIG. 14 is another drive timing diagram of a display panel according to an embodiment of the present disclosure.

FIG. 14 is another drive timing diagram of a display panel according to an embodiment of the present disclosure. With reference to FIG. 14, in the first sub-reset stage T311 in the $(N+1)^{th}$ display cycle T10, the data enable level includes a first data enable level V1. The display panel is reset to display a black screen. In the second sub-reset stage T312 in the $(N+1)^{th}$ display cycle T10, the data enable level includes a second data enable level V2, and the display panel is reset to display a white screen.

Figure 15:
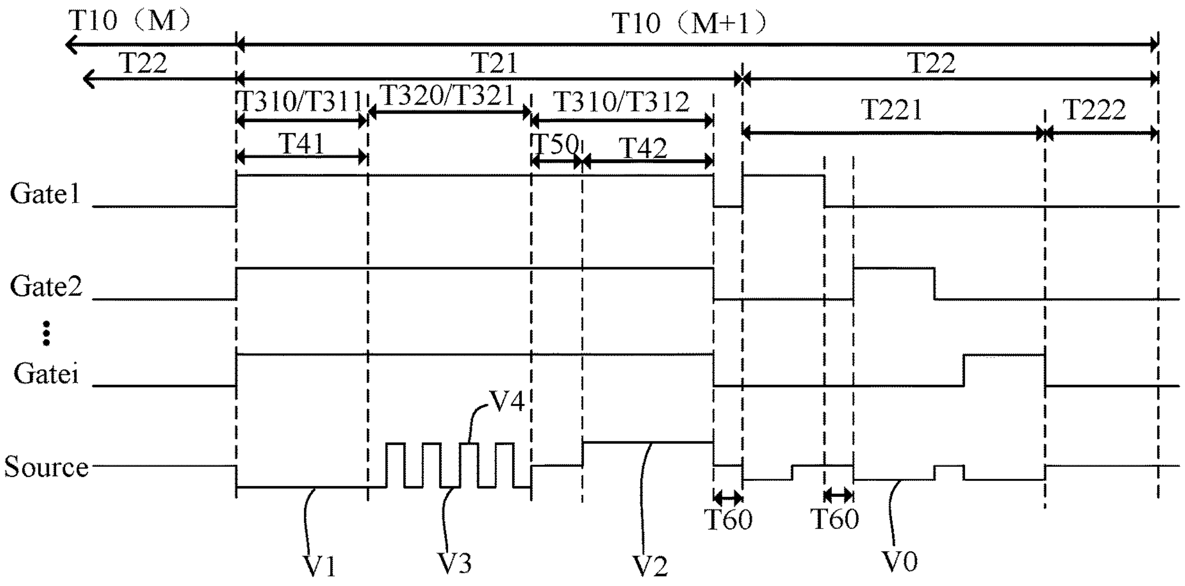
FIG. 15 is another drive timing diagram of a display panel according to an embodiment of the present disclosure.

FIG. 15 is another drive timing diagram of a display panel according to an embodiment of the present disclosure. With reference to FIG. 15, in the $(N+1)^{th}$ display cycle T10, the second sub-reset stage T312 includes a time period T42 and a trim time period T50, and the trim time period T50 is between a first sub-oscillation stage T321 and the time period T42. Therefore, after the first sub-oscillation stage T321, the data signal Source inputs a data non-enable level (for example, 0 V) in the trim time period T50, and then the display panel is reset to display a white screen in the time period T42. The setting of the trim time period T50 provides a buffer time for the particles to switch from motion to rest, thereby providing a buffer time for stabilizing the motion state of the particles in the first sub-oscillation stage T321 after the oscillation and before the reset.

Figure 16:
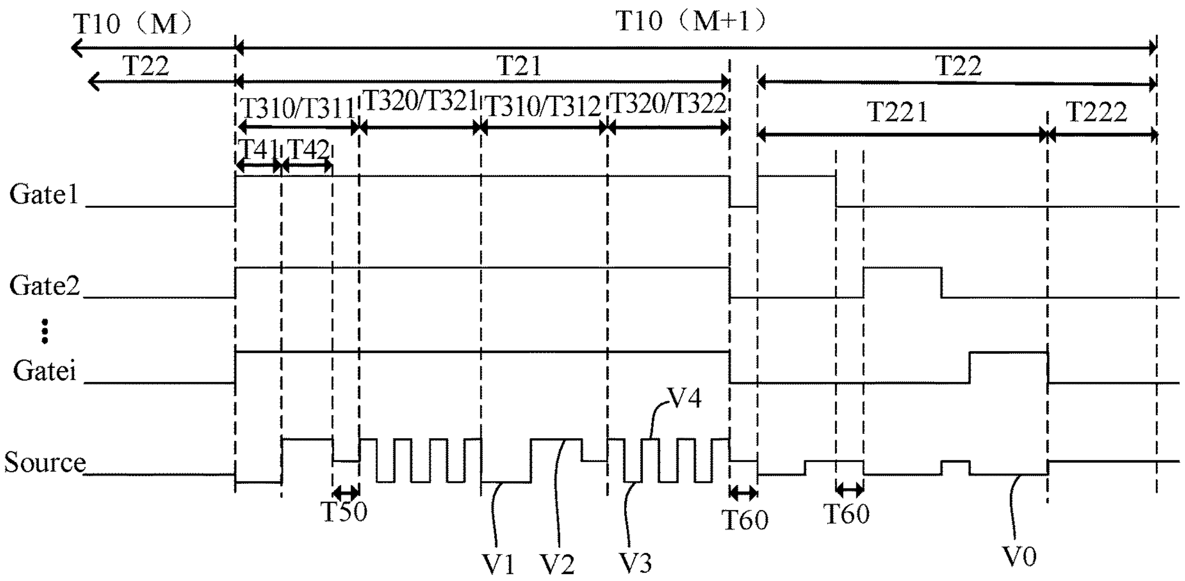
FIG. 16 is another drive timing diagram of a display panel according to an embodiment of the present disclosure.

FIG. 16 is another drive timing diagram of a display panel according to an embodiment of the present disclosure. With reference to FIG. 16, the sub-oscillation stage T320 includes a first sub-oscillation stage T321 and a second the sub-oscillation stage T322. In the same display preparation stage T21, the second sub-oscillation stage T322 is between the second sub-reset stage T312 and the display stage T22. In the embodiments of the present disclosure, the sub-reset stage T310 and the sub-oscillation stage T320 are combined, and the first sub-reset stage T311, the first sub-oscillation stage T321, the second sub-reset stage T312 and the second sub-oscillation stage T322 are carried out sequentially. After the combination of two rounds of reset and oscillation, the electrophoretic particles can move from the same state starting point.

Figure 17:
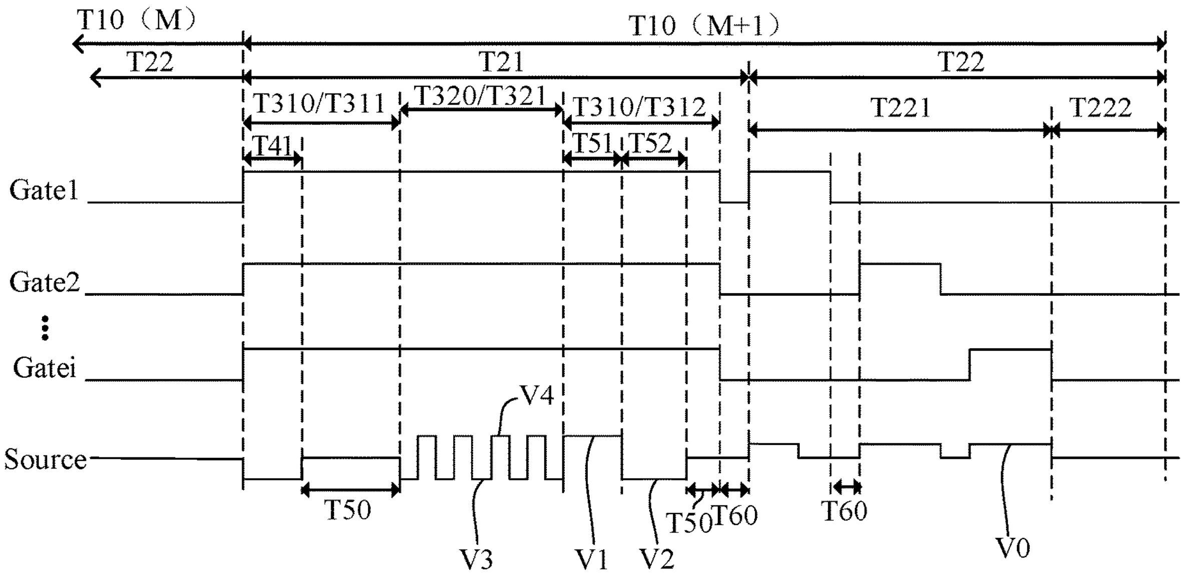
FIG. 17 is another drive timing diagram of a display panel according to an embodiment of the present disclosure.

FIG. 17 is another drive timing diagram of a display panel according to an embodiment of the present disclosure. With reference to FIG. 17, the first sub-reset stage T311 includes a balance time period (that is, the time period T41). The polarity of the data enable level in the balance time period of the $(M+1)^{th}$ display cycle T10 is the same as the polarity of the data enable level in the display stage T22 of the $M^{th}$ display cycle T10. The second sub-reset stage T312 includes a first time period T51 and a second time period T52. The first time period T51 is between the second time period T52 and the first sub-reset stage T311. The polarity of the data enable level in the first time period T51 is opposite to the polarity of the data enable level in the balance time period (that is, the time period T41), and the polarity of the data enable level in the second time period T52 is the same as the polarity of the data enable level in the balance time period. The polarity of the data enable level in the first time period T51 is opposite to the polarity of the data enable level in the second time period T52. In the same display cycle T10, the polarity of the data enable level in the display stage T22 is opposite to the polarity of the data enable level in the balance time period. In the embodiments of the present disclosure, the polarity of the data enable level in the display stage T22 of the $M^{th}$ display cycle T10 is negative. The display screen of the display panel shows that black words are written on the white background. The polarity of the data enable level in the display stage T22 of the $(M+1)^{th}$ display cycle T10 is positive. The display screen of the display panel shows that white words are written on the black background. If only the first sub-reset stage T311 is set in the display preparation stage T21 of the $(M+1)^{th}$ display cycle T10, although the screen displayed on the display panel is reset to a black screen (that is, the black background) in the first sub-reset stage T311, the display effect of the display panel in the $(M+1)^{th}$ display cycle T10 is poor. Therefore, the second sub-reset stage T312 is also set in the display preparation stage T21 of the $(M+1)^{th}$ display cycle T10, the screen displayed on the display panel is reset to a white screen (that is, the white background) in the first time period T51 of the second sub-reset stage T312, and then the screen displayed on the display panel is reset to a black screen (that is, the black background) in the second time period T52 of the second sub-reset stage T312, thereby improving the display effect of the display panel in the $(M+1)^{th}$ display cycle T10.

Optionally, with reference to FIG. 17, in the balance time period, the screen is reset to the white screen without the need to reset from the black screen, or the screen is reset to the black screen without the need to reset from the white screen. The balance time period continues the polarity of the data enable level in the display stage T22 in the previous display cycle T10 and continues the moving direction of the electrophoretic particles in the display stage T22 in the previous display cycle T10, thereby reducing the time required for reset. Therefore, the duration of the balance time period (that is, the time period T41) is less than the duration of the second time period T52.

Figure 18:
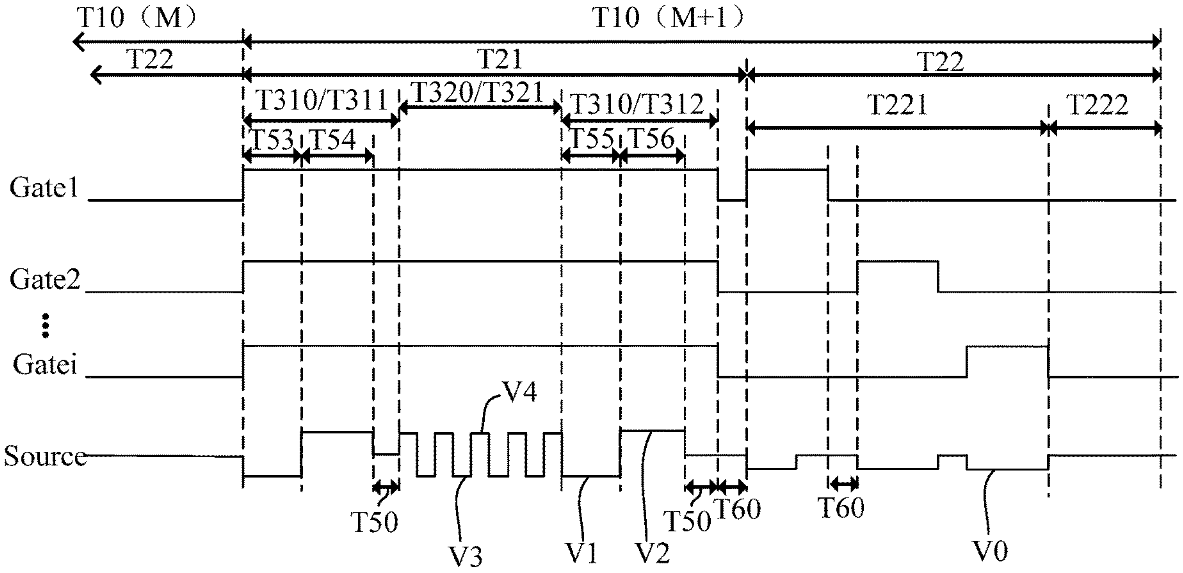
FIG. 18 is another drive timing diagram of a display panel according to an embodiment of the present disclosure.

FIG. 18 is another drive timing diagram of a display panel according to an embodiment of the present disclosure. With reference to FIG. 18, the first sub-reset stage T311 includes a third time period T53 and a fourth time period T54. The fourth time period T54 is between the third time period T53 and the first sub-oscillation stage T321. The second sub-reset stage T312 includes a fifth time period T55 and a sixth time period T56, and the fifth time period T55 is between the sixth time period T56 and the first sub-oscillation stage T321. The polarity of the data enable level in the third time period T53 is the same as the polarity of the data enable level in the fifth time period T55 and is opposite to the polarity of the data enable level in the fourth time period T54. The polarity of the data enable level in the fourth time period T54 is the same as the polarity of the data enable level in the sixth time period T56. The ratio of the duration of the third time period T53 to the duration of the fourth time period T54 is not equal to the ratio of the duration of the fifth time period T55 to the duration of the sixth time period T56.

In one embodiment, with reference to FIG. 18, the polarity of the data enable level in the third time period T53 is negative so that the screen displayed on the display panel is reset to a black screen (that is, the black background). The polarity of the data enable level in the fourth time period T54 is positive so that the screen displayed on the display panel is reset to a white screen (that is, the white background). The polarity of the data enable level in the fifth time period T55 is negative so that the screen displayed on the display panel is reset to a black screen (that is, the black background). The polarity of the data enable level in the sixth time period T56 is positive so that the screen displayed on the display panel is reset to a white screen.

In one embodiment, with reference to FIG. 18, the first sub-reset stage T311 includes a balance time period (that is, the third time period T53). The balance time period continues the polarity of the data enable level in the display stage T22 in the previous display cycle T10 and continues the moving direction of the electrophoretic particles in the display stage T22 in the previous display cycle T10, thereby reducing the duration of the third time period T53. Therefore, the ratio of the duration of the third time period T53 to the duration of the fourth time period T54 is less than the ratio of the duration of the fifth time period T55 to the duration of the sixth time period T56.

Optionally, since the sub-reset stage T310 includes at least one time period when the screen is reset to a black screen or at least one time period when the screen is reset to a white screen, the duration of the sub-reset stage T310 has a minimum time requirement, and the duration of the sub-reset stage T310 cannot be too short. Therefore, on the basis that the duration of the sub-reset stage T310 is fixed, the larger the number of sub-reset stages T310, the longer the duration of the reset stage T31 and the longer the time of the screen refresh. As a result, in the same display cycle T10, the number of the sub-reset stages T310 is less than or equal to 3, thereby reducing the duration of the reset stage T31 and reducing the time of the screen refresh.

Optionally, with reference to FIGS. 1 and 5, in the same display cycle T10, a spacing stage T60 is provided between the display preparation stage T21 and the display stage T22. In the spacing stage T60, the scan line 21 transmits the scan non-enable level, and the data line 22 transmits the data non-enable level. The data signal Source is written to the data line 22 by the driver chip and then written to the pixel drive circuit by the data line 22. Therefore, the writing of the data signal Source to the pixel drive circuit is not completed immediately and requires a certain duration. To prevent the screen generated by writing the data signal Source of the display preparation stage T21 to the pixel drive circuit in the display stage T22, the spacing stage T60 is provided between the display preparation stage T21 and the display stage T22.

Further, the scan line 21 transmits the scan non-enable level in the spacing stage T60, the data signal Source cannot be written to the pixel drive circuit, and thus the display grayscale of the sub-pixels cannot be controlled. In the spacing stage T60, the data non-enable level is applied to the data line 22, thereby reducing the power consumption of the display panel. The data non-enable level, for example, may be 0 V.

In one embodiment, with reference to FIG. 5, since the display preparation stage T21 is used for reset of particles and is not used for screen display, the accuracy requirement for writing the data signal Source in the display preparation stage T21 is not strong. Therefore, in the display preparation stage T21, no spacing stage T60 needs to be provided between the reset stage T31 and the oscillation stage T32. The reset stage T31 and the oscillation stage T32 may share the same scan enable level, thereby reducing the duration of the display preparation stage T21.

Optionally, with reference to FIGS. 1 and 5, the display stage T22 includes a spacing stage T60, and the spacing stage T60 is between the scan enable levels transmitted on the two scan lines 21. One scan line 21 transmits the scan enable level, and after the duration of the spacing stage T60, the other scan line 21 transmits the scan enable level. In the spacing stage T60, the scan line 21 transmits the scan non-enable level, and the data line 22 transmits the data non-enable level, thereby reducing the power consumption of the display panel.

In one embodiment, with reference to FIG. 5, the spacing stage T60 is greater than or equal to 1 microsecond and less than or equal to 10 microseconds.

Optionally, with reference to FIG. 5, the greater the absolute value of the data enable level, the greater the strength of the electric field generated by the pixel electrode 30 and the common electrode COM and the faster the electrophoretic particles move; the smaller the absolute value of the data enable level, the smaller the strength of the electric field generated by the pixel electrode 30 and the common electrode COM and the slower the electrophoretic particles move. In the embodiments of the present disclosure, the absolute value of the data enable level in the display stage T22 is less than the absolute value of the data enable level in the display preparation stage T21. Therefore, the absolute value of the data enable level in the display preparation stage T21 is increased, and the movement speed of the electrophoretic particle in the display preparation stage T21 is increased, thereby reducing the duration of the display preparation stage T21.

In one embodiment, with reference to FIG. 5, the data enable level in the display stage T22 is denoted as V0, and |V0| is less than any one of |V1|, |V2|, |V3| or |V4|.

Figure 19:
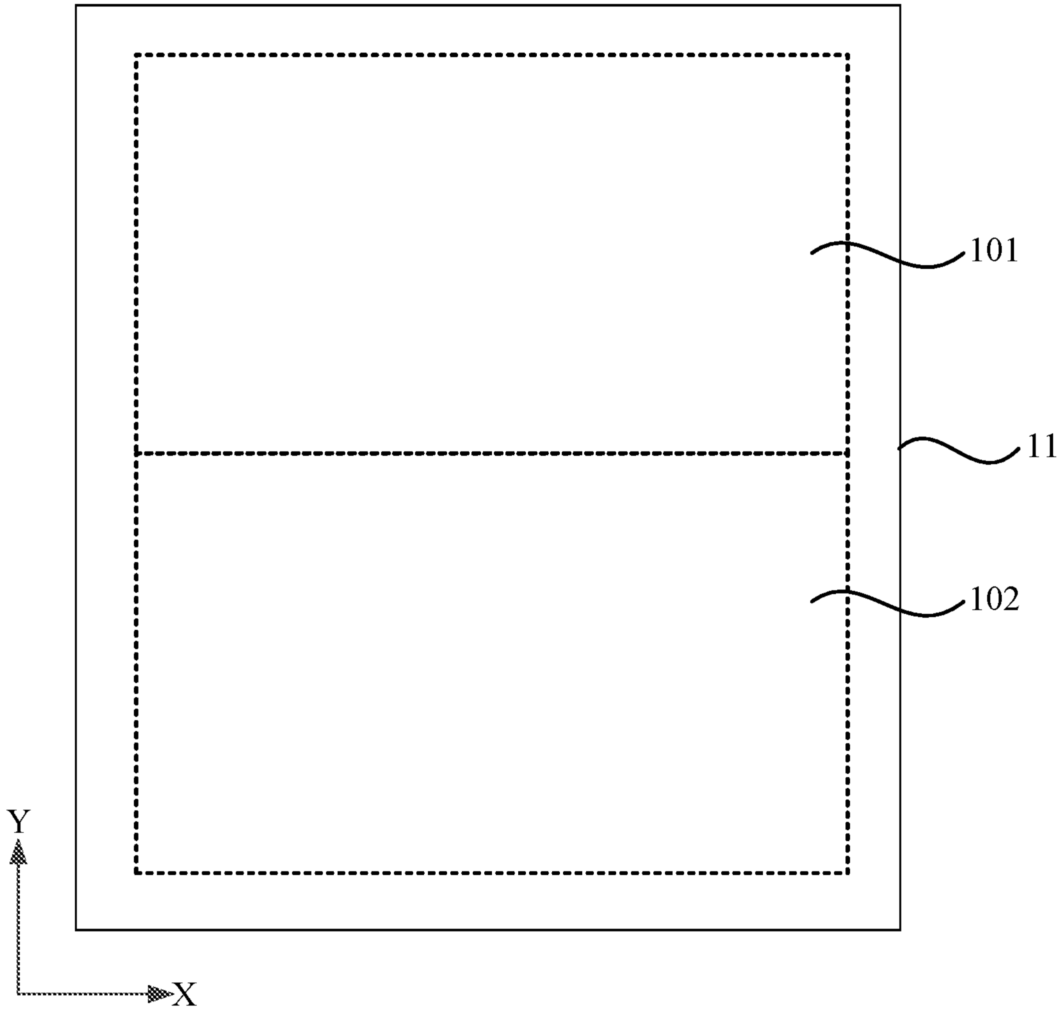
FIG. 19 is another top view of a display panel according to an embodiment of the present disclosure.
Figure 20:
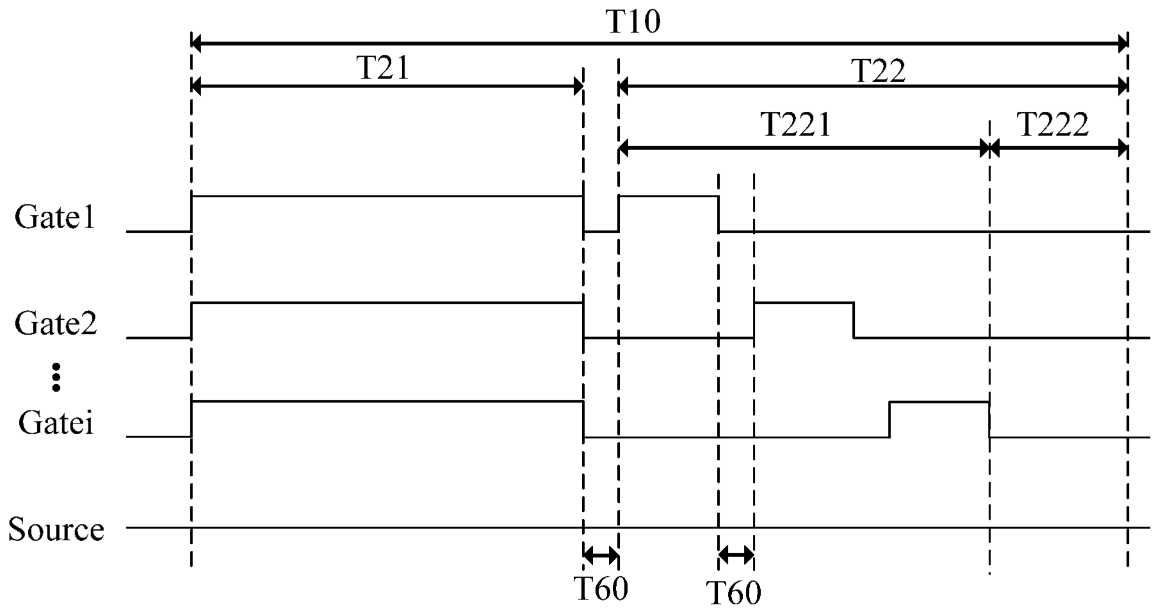
FIG. 20 is another drive timing diagram of a display panel according to an embodiment of the present disclosure.

FIG. 19 is another top view of a display panel according to an embodiment of the present disclosure, and FIG. 20 is another drive timing diagram of a display panel according to an embodiment of the present disclosure. With reference to FIGS. 1, 19, and 20, the display panel includes a first display area 101 and a second display area 102. The display cycle T10 includes a first-type display cycle and a second-type display cycle. In the display preparation stage T21 of the first-type display cycle, the data line 22 transmits at least one of the data non-enable level or the data enable level. The first-type display cycle may be the display cycle in the above-mentioned embodiments, and in the display preparation stage T21, time periods where scan enable levels transmitted on at least two scan lines 21 are located are at least partially overlapped. In the display preparation stage T21 and the display stage T22 of the second-type display cycle, the data line 22 transmits the data non-enable level. In the second-type display cycle, the data enable level is not written, the screen is not refreshed, and the screen displayed in the previous display cycle T10 is maintained. The first display area 101 includes the first-type display cycle, and the second display area 102 includes the second-type display cycle. The display cycle T10 in the first display area 101 has a short refresh duration, and screen refresh is not carried out in the second display area 102, thereby reducing the power consumption of the display panel.

In one embodiment, with reference to FIGS. 4 and 20, since the scan signal in the second-type display cycle is set in the same manner as the scan signal in the first-type display cycle, the scan signals in the first display area 101 and the second display area 102 can be generated by the same set of shift registers.

In one embodiment, with reference to FIGS. 1 and 19, the first display area 101 and the second display area 102 are arranged in the second direction Y.

Figure 21:
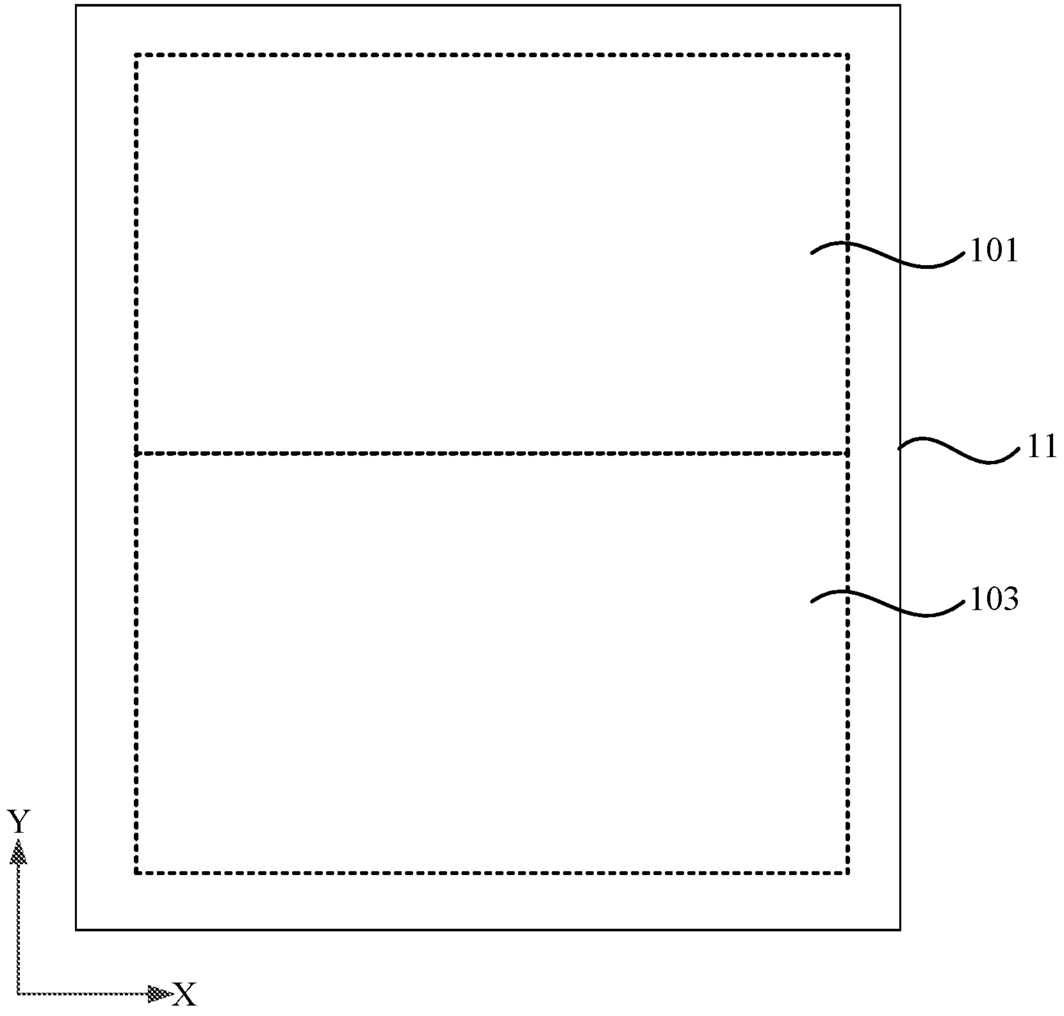
FIG. 21 is another top view of a display panel according to an embodiment of the present disclosure.
Figure 22:
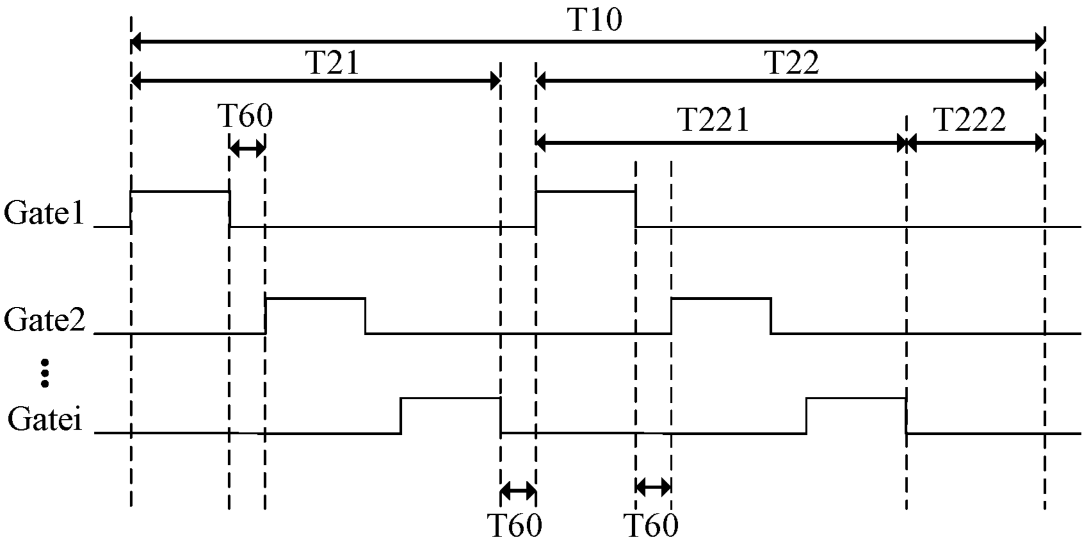
FIG. 22 is another drive timing diagram of a display panel according to an embodiment of the present disclosure.

FIG. 21 is another top view of a display panel according to an embodiment of the present disclosure, and FIG. 22 is another drive timing diagram of a display panel according to an embodiment of the present disclosure. With reference to FIGS. 1, 21, and 22, the display panel includes a first display area 101 and a third display area 103. The display cycle T10 includes a first-type display cycle and a third-type display cycle. In the display preparation stage T21 of the first-type display cycle, the data line transmits at least one of the data non-enable level or the data enable level. In the display preparation stage T21 of the third-type display cycle, the same scan line 21 transmits one scan enable level, and the scan enable level transmitted on each of the scan lines 21 has the same duration. The time periods where scan enable levels transmitted on different scan lines 21 are located are not overlapped. In the display preparation stage T21 of the third-type display cycle, the screen refresh is carried out according to the progressive scanning mode in the known techniques. The first display area 101 includes the first-type display cycle, and the third display area 103 includes the third-type display cycle. The display cycle T10 in the first display area 101 has a shorter refresh duration, and the display cycle T10 in the third display area 103 has a longer refresh duration.

In one embodiment, with reference to FIGS. 1 and 21, the first display area 101 and the third display area 103 are arranged in the second direction Y.

In other embodiments, the display panel may also include the first display area 101, the second display area 102, and the third display area 103.

FIG. 23 is another section view of a display panel according to an embodiment of the present disclosure. With reference to FIGS. 1, 2, and 21, display panel according to claim 1, the display panel includes a first substrate 11, a second substrate 12, and an electrophoretic particle 13. The first substrate 11 and the second substrate 12 are disposed opposite each other, and the electrophoretic particle 13 is between the first substrate 11 and the second substrate 12. The scan line 21 is located in at least one of the first substrate 11 or the second substrate 12, and the data line 22 is located in at least one of the first substrate 11 or the second substrate 12. The display panel provided by the embodiments of the present disclosure is an electrophoretic display panel. In other embodiments, the display panel may further be other types of display panels other than the electrophoretic display panel.

In one embodiment, with reference to FIG. 23, the electrophoretic particle 13 includes black electrophoretic particles 132 and white electrophoretic particles 131. When the black electrophoretic particles 132 are located on the display side of the display panel (for example, the side of the second substrate 12 away from the first substrate 11), the light is absorbed by the black electrophoretic particles 132, and little light is reflected to the human eye so that the display area appears to the human eye to be a dark area. When the white electrophoretic particles 131 are located on the display side of the display panel, the light is reflected by the white electrophoretic particles 131, and much light is reflected to the human eye so that the display area appears to the human eye to be a bright area. The embodiments of the present disclosure are explained and described using a two-particle system, but are not limited thereto. In other embodiments, the electrophoretic particle 13 may include a multi-particle system, and the multi-particle system includes at least three types of electrophoretic particles.

Optionally, with reference to FIGS. 1 and 5, in the display stage T22, the same scan line 21 transmits one scan enable level, the scan enable level transmitted on each of the scan lines 21 has the same duration, and the time periods where scan enable levels transmitted on different scan lines 21 are located are not overlapped. In the time period where the scan enable level of the display stage T22 is located, the data line 22 transmits at least one of the data enable level or the data non-enable level, at least one of the data enable level or the data non-enable level is written to the pixel drive circuit, and the pixel drive circuit controls the display grayscale of the sub-pixels according to the magnitude of the data enable level or according to the data non-enable level.

Figure 24:
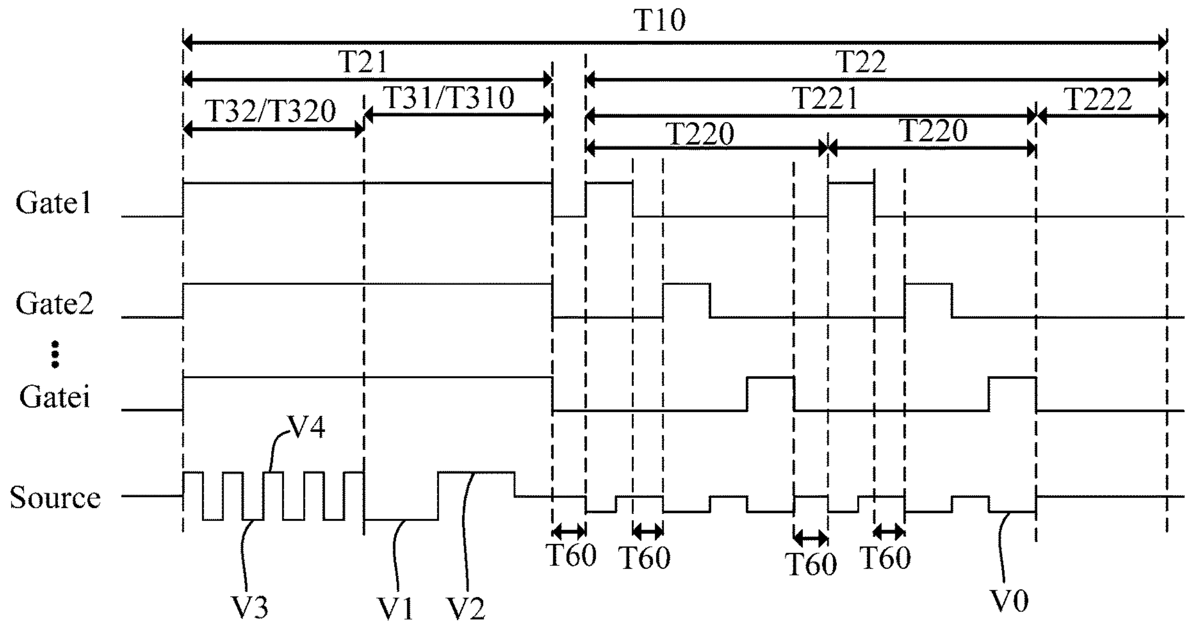
FIG. 24 is another drive timing diagram of a display panel according to an embodiment of the present disclosure.

FIG. 24 is another drive timing diagram of a display panel according to an embodiment of the present disclosure. With reference to FIGS. 1 and 24, the display stage T22 includes P secondary sub-display stages T220 (in FIG. 24, for example, P=2), where P is a positive integer greater than 1. In each secondary sub-display stage T220, the same data line 22 transmits the same data signal Source. In the same secondary sub-display stage T220, the same scan line 21 transmits one scan enable level, the scan enable level transmitted on each of the scan lines 21 has the same duration, and the time periods where scan enable levels transmitted on different scan lines 21 are located are not overlapped. In the embodiments of the present disclosure, each secondary sub-display stage T220 carries out progressive refresh, and P secondary sub-display stages T220 are repeated to achieve the screen display.

In one embodiment, with reference to FIGS. 5 and 24, the duration of the single scan enable level in the display stage T22 shown in FIG. 5 is P times the duration of the single scan enable level in the display stage T22 shown in FIG. 24, where P is a positive integer greater than 1. For the same scan signal, P successive scan signal pulses are set in the time period where the single scan enable level in the display stage T22 shown in FIG. 5 is located.

Figure 25:
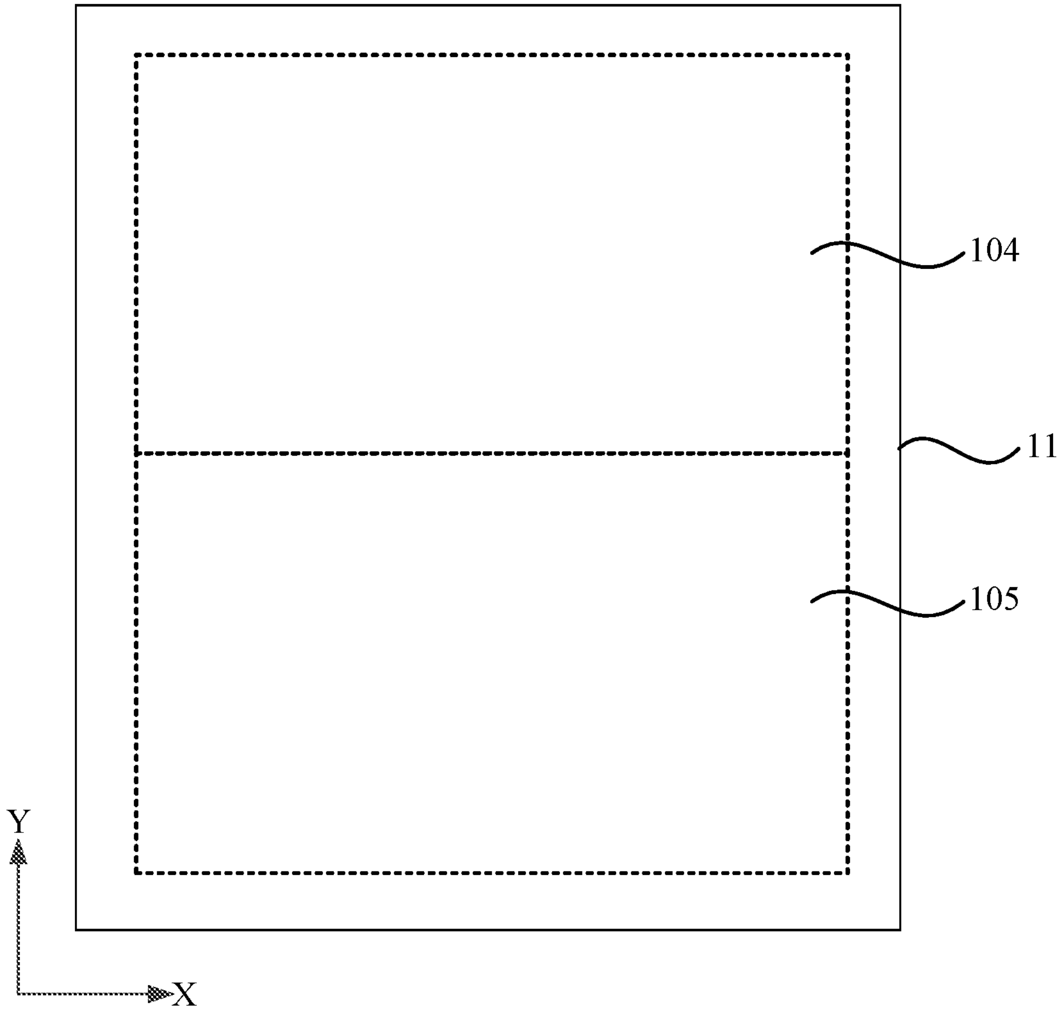
FIG. 25 is another top view of a display panel according to an embodiment of the present disclosure.
Figure 26:
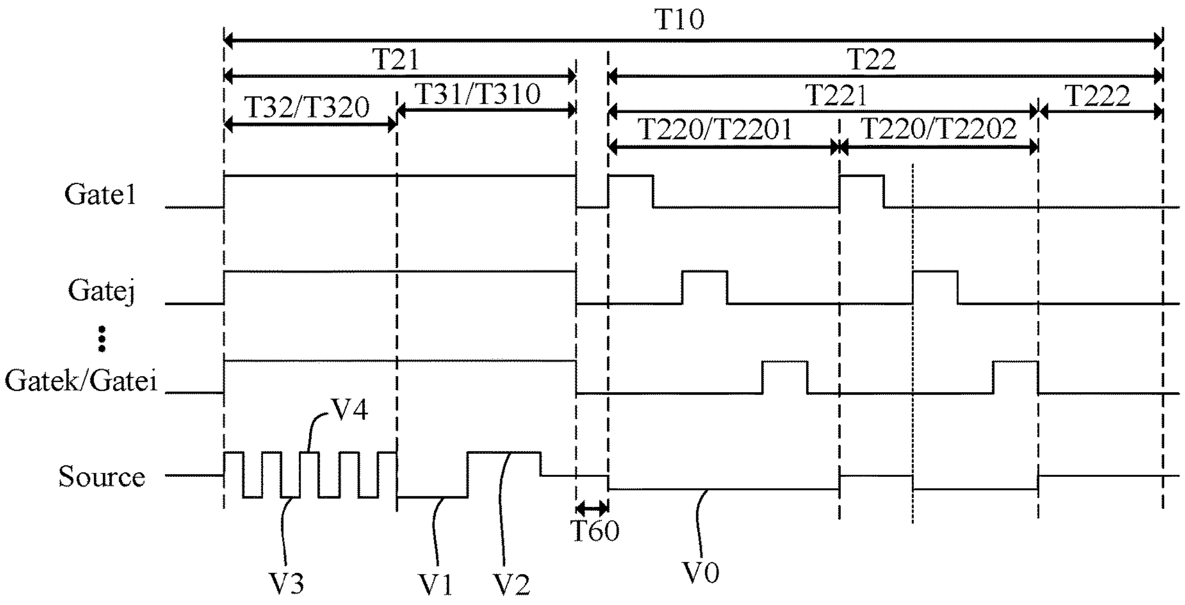
FIG. 26 is another drive timing diagram of a display panel according to an embodiment of the present disclosure.

FIG. 25 is another top view of a display panel according to an embodiment of the present disclosure, and FIG. 26 is another drive timing diagram of a display panel according to an embodiment of the present disclosure. With reference to FIGS. 1, 25, and 26, the display stage T22 includes P secondary sub-display stages T220 (in FIG. 25, for example, P=2). In each secondary sub-display stage T220, the same data line 22 transmits the same data signal Source. In the same secondary sub-display stage T220, the same scan line 21 transmits one scan enable level, the scan enable level transmitted on each of the scan lines 21 has the same duration, and the time periods where scan enable levels transmitted on different scan lines 21 are located are not overlapped.

The scan signal includes a first scan signal Gate1, a $j^{th}$ scan signal Gatej, . . . , a $k^{th}$ scan signal Gatek, . . . , and an $i^{th}$ scan signal Gatei, where 2≤j<k, k≤i, and i is a positive integer greater than 1. The P secondary sub-display stages T220 includes a first secondary sub-display stage T2201 and a second secondary sub-display stage T2202. In the first secondary sub-display stage T2201, the data line 22 transmits at least one of the data enable level or the data non-enable level in the time periods where scan enable levels of the first scan signal Gate1 to the $i^{th}$ scan signal Gatei are located, at least one of the data enable level or the data non-enable level is written to the pixel drive circuit, and the pixel drive circuit of each line controls the display grayscale of the sub-pixels according to the magnitude of the data enable level or according to the data non-enable level. In the second secondary sub-display stage T2202, the data line 22 transmits the data non-enable level in the time periods where scan enable levels of the first scan signal to the $j^{th}$ scan signal are located, then no data enable level is written to the pixel drive circuits of the first line to the $j^{th}$ line, and the display greyscale of the sub-pixels is not changed. The data line 22 transmits at least one of the data enable level or the data non-enable level in the time periods where the scan enable levels of the $j^{th}$ scan signal Gatej to the $k^{th}$ scan signal Gatek are located (in FIG. 26, for example, k=i), at least one of the data enable level or the data non-enable level is written to the pixel drive circuit, and the pixel drive circuits of the $j^{th}$ line to the $k^{th}$ line control the display grayscale of the sub-pixels according to the magnitude of the data enable level or according to the data non-enable level.

In one embodiment, with reference to FIGS. 25 and 26, the first secondary sub-display stage T2201 is between the display preparation stage T21 and the secondary sub-display stage T2202. The secondary sub-display stage T220 is between the first secondary sub-display stage T2201 and the second sub-display stage T222.

In one embodiment, with reference to FIGS. 1, 25, and 26, the display panel includes a fourth display area 104 and a fifth display area 105. The scan lines 211 in the fourth display area 104 transmit the first scan signal Gate1 to the $j^{th}$ scan signal Gatej, and the scan lines 211 in the fifth display area 105 transmit the $j^{th}$ scan signal Gatej to the $k^{th}$ scan signal Gatek. The data signals are separately input to the display panel according to different areas and at different times, which means that the data signals are written to different areas in different sub-display stages T220. The display screen in the fourth display area 104 is determined by the data signals written in the first secondary sub-display stage T2201, and the display screen in the fifth display area 105 is determined by the data signals written in both the first secondary sub-display stage T2201 and the second secondary sub-display stage T2202.

It is to be understood that when the data signals are input to the display panel according to different areas and at different times, the number of partitions of the display panel is denoted as Q, Q is less than or equal to P, and Q is a positive integer greater than 1.

Figure 27:
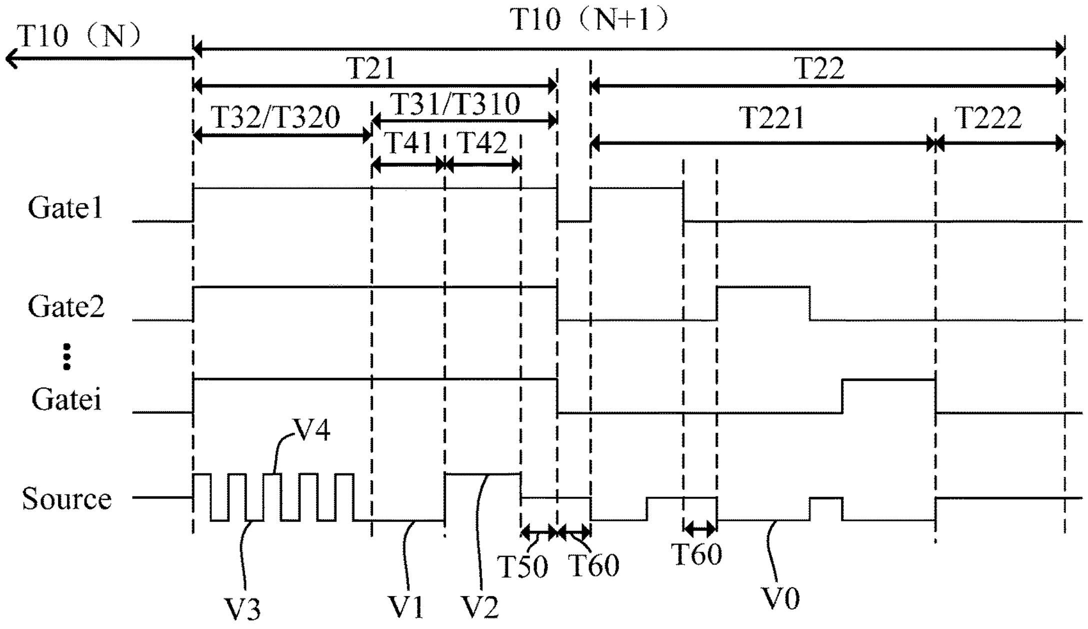
FIG. 27 is another drive timing diagram of a display panel according to an embodiment of the present disclosure.

FIG. 27 is another drive timing diagram of a display panel according to an embodiment of the present disclosure. With reference to FIG. 27, the absolute value of the data enable level in the display stage T22 is equal to the absolute value of the data enable level in the display preparation stage T21.

In one embodiment, with reference to FIG. 27, V0=V1=V3.

Figure 28:
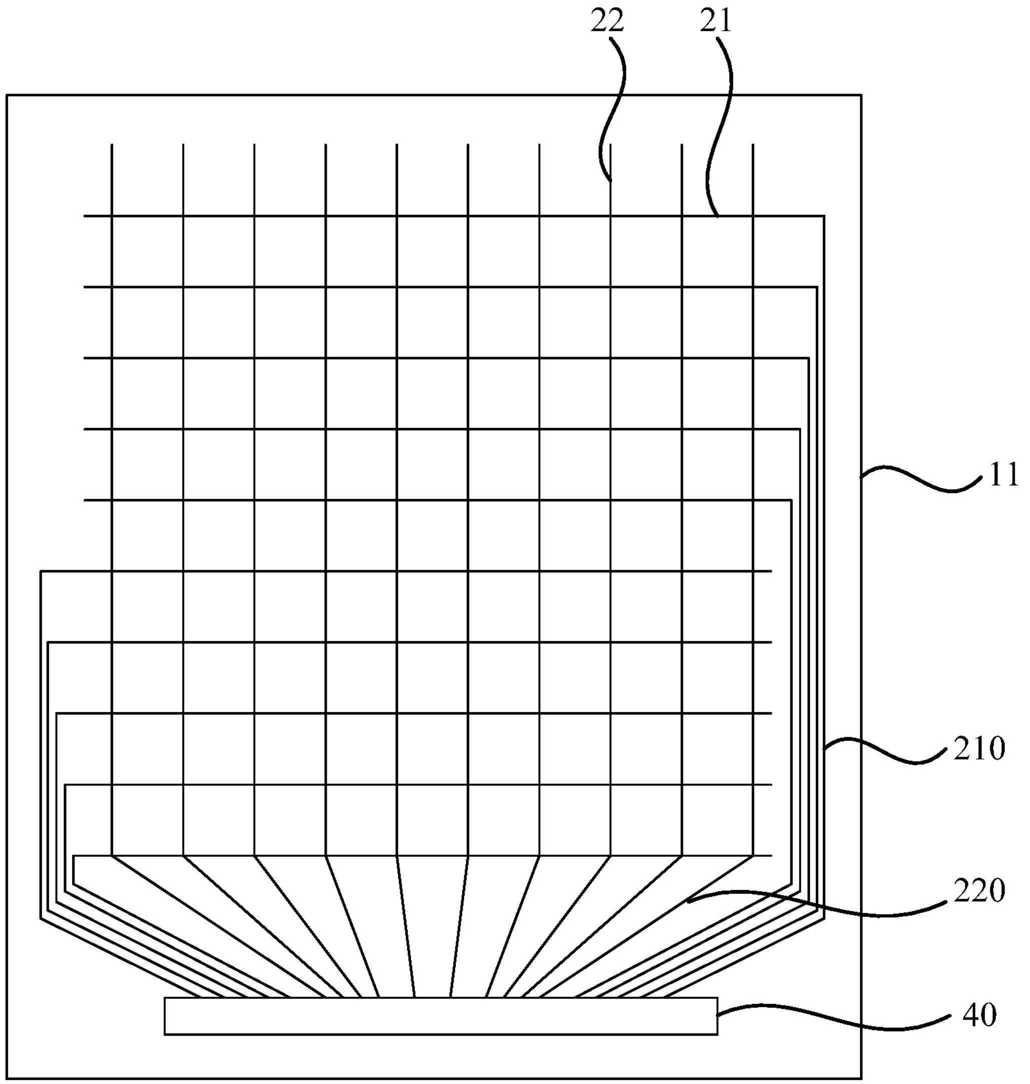
FIG. 28 is a top view of a display device according to an embodiment of the present disclosure.

FIG. 28 is a top view of a display device according to an embodiment of the present disclosure. With reference to FIG. 28, the display device includes a display panel and a driver chip 40. The driver chip 40 is electrically connected to the data lines 22 and scan lines 21. The driver chip 40 provides scan signals to the scan lines 21 and provides data signals Source to the data lines 22. Since the display device in the embodiments of the present disclosure includes the display panel described in the above-mentioned embodiments, the display device has the beneficial effects of the display panel, that is, the duration of the display preparation stage is reduced and the duration of the screen refresh is reduced.

For example, the display device may include at least one of an electronic billboard, a computer, a mobile phone or an e-reader.

In one embodiment, with reference to FIG. 28, the display device further includes first leads 210 and second leads 220. One end of a first lead 210 is electrically connected to a scan line 21, the other end of the first lead 210 is electrically connected to the driver chip 40, and the first lead 210 is configured to connect the scan line 21 and the driver chip 40. One end of a second lead 220 is electrically connected to a data line 22, the other end of the second lead 220 is electrically connected to the driver chip 40, and the second lead 220 is configured to connect the data line 22 and the driver chip 40.

It is to be noted that the preceding are only preferred embodiments of the present disclosure and the technical principles used therein. It is to be understood by those skilled in the art that the present disclosure is not limited to the embodiments described herein. For those skilled in the art, various apparent modifications, adaptations, combinations, and substitutions can be made without departing from the scope of the present disclosure. Therefore, while the present disclosure has been described in detail through the preceding embodiments, the present disclosure is not limited to the preceding embodiments and may include more equivalent embodiments without departing from the concept of the present disclosure. The scope of the present disclosure is determined by the scope of the appended claims.

What is claimed is:

1. A display panel, comprising a plurality of scan lines and a plurality of data lines, wherein a scan line of the plurality of scan lines is configured to transmit a scan signal, and the scan signal comprises a scan enable level and a scan non-enable level; a data line of the plurality of data lines is configured to transmit a data signal, and the data signal comprises a data enable level and a data non-enable level;

the display panel comprises a display cycle, wherein the display cycle comprises a display preparation stage and a display stage, and the display preparation stage is before the display stage;

the scan line extends in a first direction, the scan line comprises a first scan line electrically connected to a first pixel group and a second scan line electrically connected to a second pixel group, the first scan line and the second scan line are arranged in a second direction, and the second direction intersects the first direction; in the display preparation stage, a time period where the scan enable level transmitted on the first scan line is located is at least partially overlapped with a time period where the scan enable level transmitted on the second scan line is located.

2. The display panel according to claim 1, wherein in the display preparation stage, the time period where the scan enable level transmitted on the first scan line is located is the same as the time period where the scan enable level transmitted on the second scan line is located.

3. The display panel according to claim 1, wherein the display preparation stage comprises a reset stage and an oscillation stage;

in a same display cycle, a write frequency of an enable level of the data signal in the oscillation stage is greater than a write frequency of an enable level of the data signal in the reset stage.

4. The display panel according to claim 1, wherein the display preparation stage comprises a reset stage, and the reset stage comprises at least one sub-reset stage;

the data enable level comprises a first data enable level and a second data enable level, wherein a polarity of the first data enable level is opposite to a polarity of the second data enable level;

the sub-reset stage comprises at least one of one time period where the first data enable level is located or one time period where the second data enable level is located.

5. The display panel according to claim 4, wherein the display preparation stage further comprises an oscillation stage, and the oscillation stage comprises at least one sub-oscillation stage;

the data enable level comprises a third data enable level and a fourth data enable level, wherein a polarity of the third data enable level is opposite to a polarity of the fourth data enable level;

the sub-oscillation stage comprises a plurality of time periods where the third data enable level is located and a plurality of time periods where the fourth data enable level is located; or wherein a sub-reset stage of an $(M+1)^{th}$ display cycle is adjacent to a display stage of an $M^{th}$ display cycle, and M is a positive integer.

6. The display panel according to claim 5, wherein in a same display cycle, a duration of the oscillation stage is less than a duration of the reset stage.

7. The display panel according to claim 1, wherein the display preparation stage comprises one time period where the scan enable level is located; or the display preparation stage comprises a plurality of time periods where the scan enable level is located.

8. The display panel according to claim 5, wherein the sub-reset stage comprises a first sub-reset stage and a second sub-reset stage;

the sub-oscillation stage comprises a first sub-oscillation stage;

in a same display preparation stage, the first sub-oscillation stage is between the first sub-reset stage and the second sub-reset stage, and the second sub-reset stage is between the first sub-oscillation stage and the display stage.

9. The display panel according to claim 8, wherein the first sub-reset stage comprises a balance time period;

a polarity of a data enable level in a balance time period of an $(M+1)^{th}$ display cycle is a same as a polarity of a data enable level in a display stage of an Mh display cycle;

the second sub-reset stage comprises a first time period and a second time period, the first time period is between the second time period and the first sub-reset stage, a polarity of a data enable level in the first time period is opposite to a polarity of a data enable level in the balance time period, and a polarity of a data enable level in the second time period is a same as the polarity of the data enable level in the balance time period;

in a same display cycle, a polarity of a data enable level in the display stage is opposite to the polarity of the data enable level in the balance time period.

10. The display panel according to claim 9, wherein a duration of the balance time period is less than a duration of the second time period.

11. The display panel according to claim 8, wherein the first sub-reset stage comprises a third time period and a fourth time period, and the fourth time period is between the third time period and the first sub-oscillation stage; the second sub-reset stage comprises a fifth time period and a sixth time period, and the fifth time period is between the sixth time period and the first sub-oscillation stage;

a polarity of a data enable level in the third time period is a same as a polarity of a data enable level in the fifth time period and is opposite to a polarity of a data enable level in the fourth time period; the polarity of the data enable level in the fourth time period is a same as a polarity of a data enable level in the sixth time period;

a ratio of a duration of the third time period to a duration of the fourth time period is not equal to a ratio of a duration of the fifth time period to a duration of the sixth time period.

12. The display panel according to claim 4, wherein in a same display cycle, a number of sub-reset stages is less than or equal to 3; or in a same display cycle, the sub-reset stage is adjacent to the display stage.

13. The display panel according to claim 4, wherein in an $(N+1)^{th}$ display cycle, a sub-reset stage that is the closest in time distance to a display stage in an $N^{th}$ display cycle comprises a balance time period, and N is a positive integer;

a polarity of a data enable level in the balance time period is a same as a polarity of a data enable level in a display stage in a previous display cycle; or wherein the sub-reset stage further comprises a trim time period, and in the trim time period, the data line transmits the data non-enable level.

14. The display panel according to claim 1, wherein in a same display cycle, a spacing stage is provided between the display preparation stage and the display stage;

in the spacing stage, the scan line transmits the scan non-enable level, and the data line transmits the data non-enable level.

15. The display panel according to claim 1, wherein an absolute value of the data enable level in the display stage is less than an absolute value of the data enable level in the display preparation stage.

16. The display panel according to claim 1, comprising a first display area and a second display area;

wherein the display cycle comprises a first-type display cycle and a second-type display cycle; in a display preparation stage of the first-type display cycle, the data line transmits at least one of the data non-enable level or the data enable level;

in a display preparation stage and a display stage of the second-type display cycle, the data line transmits the data non-enable level;

the first display area comprises the first-type display cycle, and the second display area comprises the second-type display cycle.

17. The display panel according to claim 1, comprising a first display area and a third display area;

wherein the display cycle comprises a first-type display cycle and a third-type display cycle; in a display preparation stage of the first-type display cycle, the data line transmits at least one of the data non-enable level or the data enable level;

in a display preparation stage of the third-type display cycle, a same scan line transmits one scan enable level, and a scan enable level transmitted on each of the scan lines has a same duration;

the first display area further comprises the first-type display cycle, and the third display area comprises the third-type display cycle.

18. The display panel according to claim 1, comprising a first substrate, a second substrate, and an electrophoretic particle;

wherein the scan line is located in at least one of the first substrate or the second substrate;

the data line is located in at least one of the first substrate or the second substrate;

the electrophoretic particle is located between the first substrate and the second substrate.

19. The display panel according to claim 1, wherein the display stage comprises P secondary sub-display stages, where P is a positive integer greater than 1;

in each of the P secondary sub-display stages, a same data line transmits a same data signal; and wherein the scan signal comprises a first scan signal, a $j^{th}$ scan signal, . . . , a $k^{th}$ scan signal, and . . . an $i^{th}$ scan signal, wherein $2 \leq j < k$, $k \leq i$, and i is a positive integer greater than 1;

the P secondary sub-display stages comprise a first secondary sub-display stage and a second secondary sub-display stage; in the first secondary sub-display stage, the data line transmits at least one of the data enable level or the data non-enable level in time periods where scan enable levels of the first scan signal to the $i^{th}$ scan signal are located;

in the second secondary sub-display stage, the data line transmits the data non-enable level in time periods where scan enable levels of the first scan signal to the $j^{th}$ scan signal are located, and the data line transmits at least one of the data enable level or the data non-enable level in time periods where scan enable levels of the $j^{th}$ scan signal to the $k^{th}$ scan signal are located.

20. A display device, comprising a display panel and a driver chip, wherein the driver chip is electrically connected to the plurality of data lines and the plurality of scan lines; and wherein display panel comprises a plurality of scan lines and a plurality of data lines, wherein a scan line of the plurality of scan lines is configured to transmit a scan signal, and the scan signal comprises a scan enable level and a scan non-enable level; a data line of the plurality of data lines is configured to transmit a data signal, and the data signal comprises a data enable level and a data non-enable level;

the display panel comprises a display cycle, wherein the display cycle comprises a display preparation stage and a display stage, and the display preparation stage is before the display stage;

the scan line extends in a first direction, the scan line comprises a first scan line electrically connected to a first pixel group and a second scan line electrically connected to a second pixel group, the first scan line and the second scan line are arranged in a second direction, and the second direction intersects the first direction; in the display preparation stage, a time period where the scan enable level transmitted on the first scan line is located is at least partially overlapped with a time period where the scan enable level transmitted on the second scan line is located.

* * * * *